US008290982B2

(12) United States Patent
Lara et al.

(10) Patent No.: US 8,290,982 B2
(45) Date of Patent: Oct. 16, 2012

(54) METHODS FOR MANAGING CONTENT FOR BRAND RELATED MEDIA

(75) Inventors: Ankarino Lara, San Francisco, CA (US); Scott Bedard, San Francisco, CA (US); Anthony D. Chen, Santa Monica, CA (US); Shravan K. Goli, San Jose, CA (US); Alexei Stoliartchouk, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 706 days.

(21) Appl. No.: 11/863,204

(22) Filed: Sep. 27, 2007

(65) Prior Publication Data

US 2009/0089310 A1 Apr. 2, 2009

(51) Int. Cl.
*G06F 17/30* (2006.01)
(52) U.S. Cl. ...................................... 707/785
(58) Field of Classification Search ............... 707/785
See application file for complete search history.

(56) References Cited

U.S. PATENT DOCUMENTS

| | | | |
|---|---|---|---|
| 6,754,833 B1 * | 6/2004 | Black et al. ...................... 726/7 |
| 7,353,199 B1 * | 4/2008 | DiStefano, III ................ 705/37 |
| 7,457,823 B2 * | 11/2008 | Shraim et al. ...................... 1/1 |
| 7,870,608 B2 * | 1/2011 | Shraim et al. ................... 726/22 |
| 7,913,302 B2 * | 3/2011 | Shraim et al. ................... 726/22 |
| 7,992,204 B2 * | 8/2011 | Shraim et al. ................... 726/22 |
| 8,041,769 B2 * | 10/2011 | Shraim et al. ................. 709/206 |
| 2002/0120506 A1 * | 8/2002 | Hagen ............................. 705/14 |
| 2002/0120859 A1 * | 8/2002 | Lipkin et al. ................... 713/200 |
| 2002/0123957 A1 * | 9/2002 | Notarius et al. ............... 705/37 |
| 2002/0188527 A1 * | 12/2002 | Dillard et al. ................. 705/27 |
| 2003/0229900 A1 * | 12/2003 | Reisman ........................ 725/87 |
| 2004/0093281 A1 * | 5/2004 | Silverstein et al. ........... 705/26 |
| 2004/0249643 A1 * | 12/2004 | Ouyang et al. .................. 705/1 |
| 2005/0004838 A1 * | 1/2005 | Perkowski et al. ............ 705/14 |
| 2005/0091220 A1 * | 4/2005 | Klemow ......................... 707/10 |
| 2005/0154769 A1 * | 7/2005 | Eckart et al. ................. 707/201 |

(Continued)

OTHER PUBLICATIONS

Schiefer, J.; Jun-jang Jeng; Kapoor, S.; Chowdhary, P., "Process information factory: a data management approach for enhancing business process intelligence," e-Commerce Technology, 2004. CEC 2004. Proceedings. IEEE International Conference on , vol., No., pp. 162-169, Jul. 6-9, 2004 URL: http://ieeexplore.ieee.org/stamp/stamp.jsp?arnumber=1319730.*

(Continued)

*Primary Examiner* — Mark Andrew X Radtke
(74) *Attorney, Agent, or Firm* — Martine Penilla Group, LLP

(57) ABSTRACT

Computer-implemented methods for defining access to brand related assets are provided. One method includes generating a website that relates to a specific brand, where the specific brand is associated with a plurality of assets that are integrated with the website, and the plurality of assets are obtained from a number of disparate sources. The method also includes assigning each asset an identifier, where the identifier defines a relation of each asset to the specific brand and defining a dashboard access to the specific brand. The dashboard access is configured to identify a user privilege for accessing specific ones of the plurality of assets of the specific brand, the user privilege enabling one or more of viewing details of an existing asset, adding a new asset, and modifying an existing asset. The user privilege for accessing specific assets enables management of plurality of assets that are integrated with the website, and the management of the plurality of assets overriding control of the plurality of assets provided by the number of disparate sources.

23 Claims, 18 Drawing Sheets

U.S. PATENT DOCUMENTS

| | | | | |
|---|---|---|---|---|
| 2005/0273705 A1* | 12/2005 | McCain | | 715/513 |
| 2006/0026213 A1* | 2/2006 | Yaskin et al. | | 707/200 |
| 2006/0068755 A1* | 3/2006 | Shraim et al. | | 455/410 |
| 2006/0069697 A1* | 3/2006 | Shraim et al. | | 707/102 |
| 2006/0123053 A1* | 6/2006 | Scannell, Jr. | | 707/104.1 |
| 2006/0190333 A1* | 8/2006 | Choi | | 705/14 |
| 2006/0200259 A1* | 9/2006 | Hoffberg et al. | | 700/86 |
| 2006/0294199 A1* | 12/2006 | Bertholf | | 709/217 |
| 2007/0038567 A1* | 2/2007 | Allaire et al. | | 705/50 |
| 2007/0038931 A1* | 2/2007 | Allaire et al. | | 715/526 |
| 2007/0061199 A1* | 3/2007 | Montgomery et al. | | 705/14 |
| 2007/0107053 A1* | 5/2007 | Shraim et al. | | 726/22 |
| 2007/0162349 A1* | 7/2007 | Silver | | 705/26 |
| 2007/0192853 A1* | 8/2007 | Shraim et al. | | 726/22 |
| 2007/0233566 A1* | 10/2007 | Zlotin et al. | | 705/14 |
| 2007/0239610 A1* | 10/2007 | Lemelson | | 705/51 |
| 2007/0244872 A1* | 10/2007 | Hancock | | 707/3 |
| 2007/0244904 A1* | 10/2007 | Durski | | 707/10 |
| 2007/0294352 A1* | 12/2007 | Shraim et al. | | 709/206 |
| 2007/0294762 A1* | 12/2007 | Shraim et al. | | 726/22 |
| 2007/0299777 A1* | 12/2007 | Shraim et al. | | 705/51 |
| 2007/0299915 A1* | 12/2007 | Shraim et al. | | 709/206 |
| 2008/0008348 A1* | 1/2008 | Metois et al. | | 382/100 |
| 2008/0033815 A1* | 2/2008 | Choi | | 705/14 |
| 2008/0065508 A1* | 3/2008 | Watt et al. | | 705/26 |
| 2008/0167947 A1* | 7/2008 | Skinner et al. | | 705/10 |
| 2008/0255944 A1* | 10/2008 | Shah et al. | | 705/14 |
| 2008/0262858 A1* | 10/2008 | Broady et al. | | 705/1 |
| 2008/0262907 A1* | 10/2008 | Broady et al. | | 705/14 |
| 2008/0262908 A1* | 10/2008 | Broady et al. | | 705/14 |

OTHER PUBLICATIONS

Pawan Chowdhary; Themis Palpanas; Florian Pinel; Shyh-Kwei Chen; Frederick Y. Wu, "Model-Driven Dashboards for Business Performance Reporting," Enterprise Distributed Object Computing Conference, 2006. EDOC '06. 10th IEEE International, vol., No., pp. 374-386, Oct. 2006 URL: http://ieeexplore.ieee.org/stamp/stamp.jsp?arnumber=4031224&isnumber=403117.*

* cited by examiner

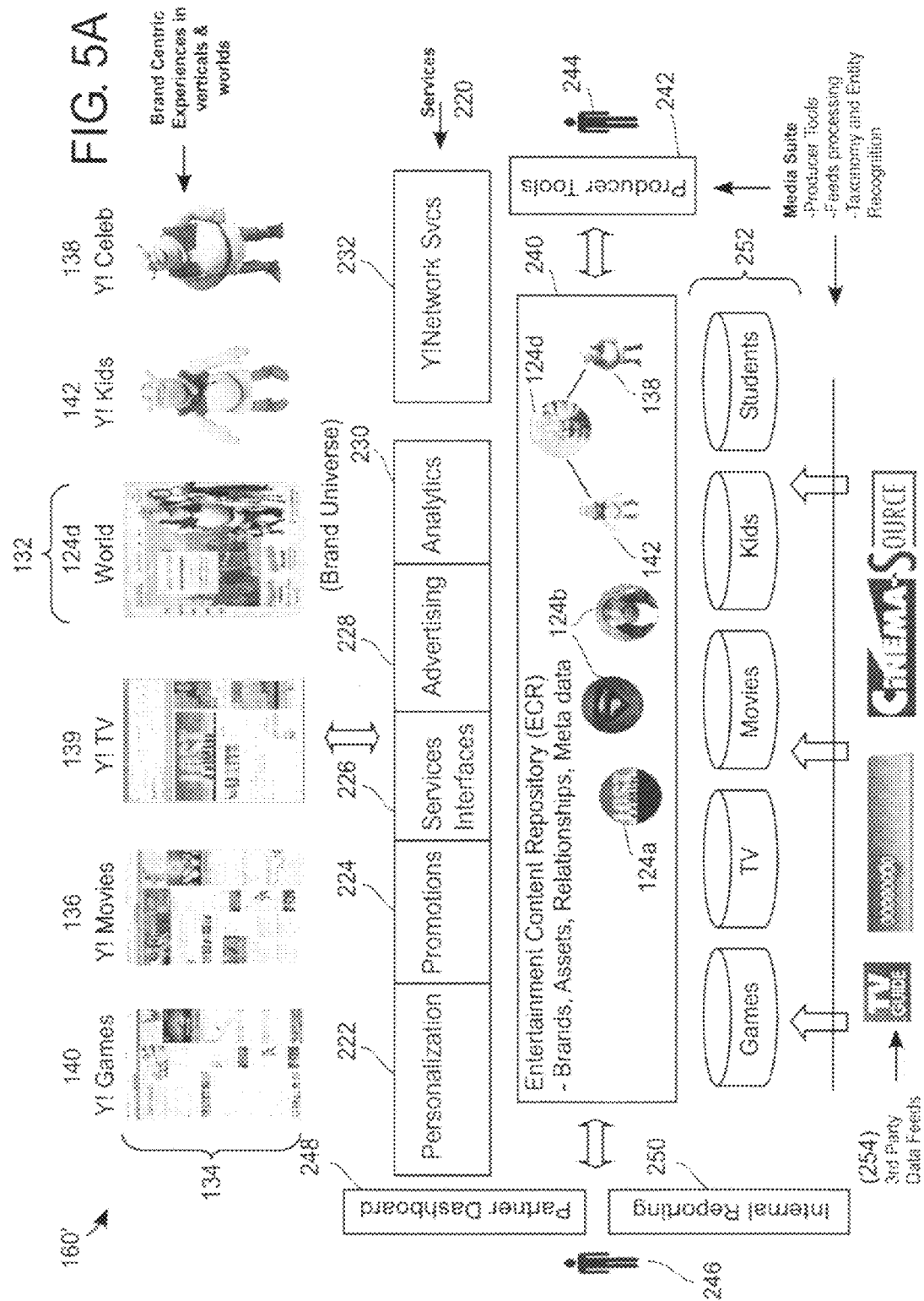

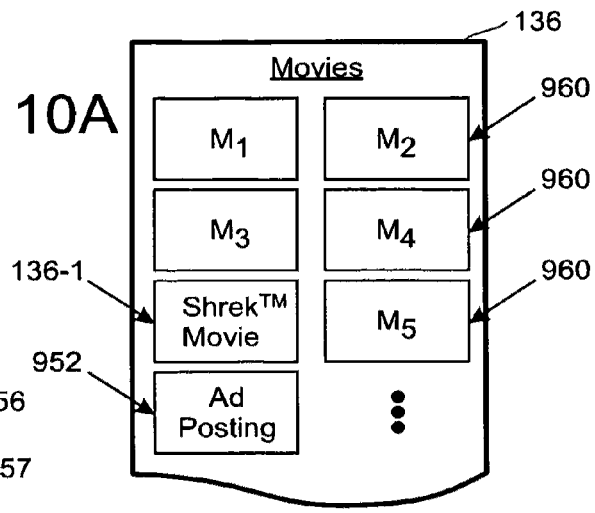
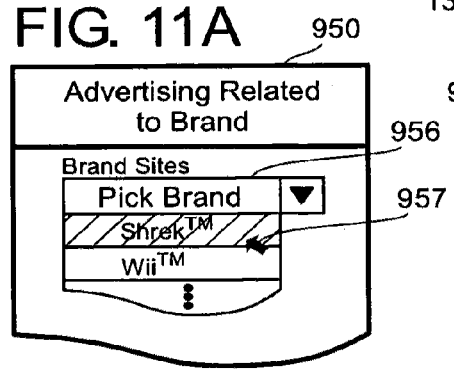
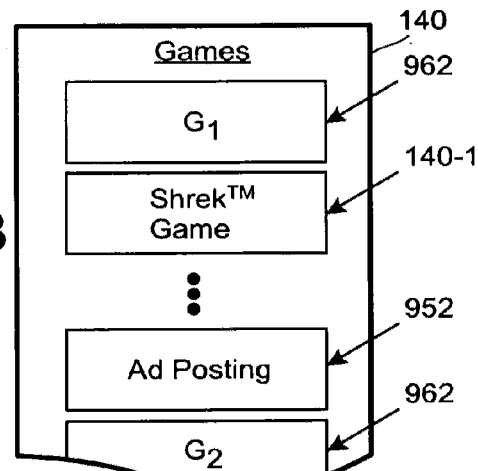
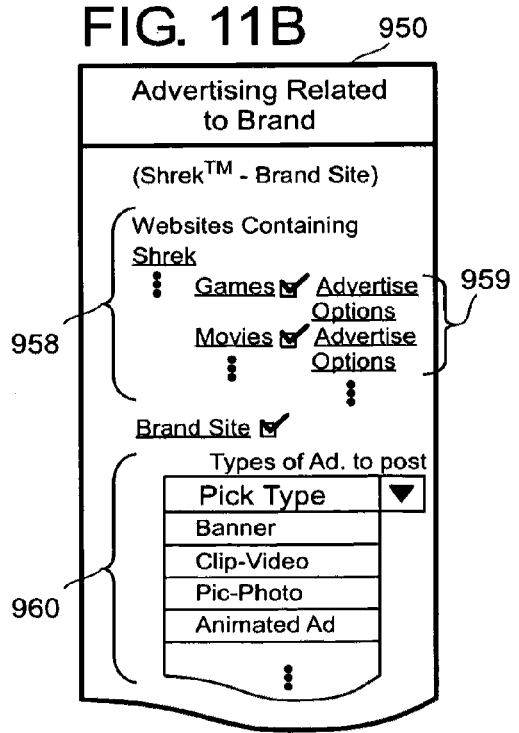
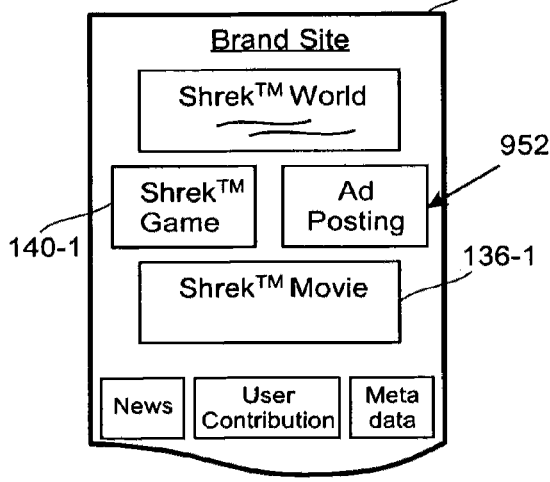
FIG. 10A
FIG. 10B
FIG. 10C
FIG. 11A
FIG. 11B

METHODS FOR MANAGING CONTENT FOR BRAND RELATED MEDIA

CROSS-REFERENCE TO RELATED APPLICATIONS

This Application is related to co-pending: (1) patent application Ser. No. 11/736,560, filed on Apr. 17, 2007, entitled "Systems and Methods for Managing a Brand universe for User Information, Brand Related Marketing and User Interactivity" (2) patent application Ser. No. 11/736,571, filed on Apr. 17, 2007, entitled "Methods For Promoting Brand-Centric Advertising and Managing the Same", (3) patent application Ser. No. 11/863,187, filed on the same day as the instant application, and entitled "Methods for Cross-Market Brand Advertising, Content Metric Analysis, and Placement Recommendations"; and (4) patent application Ser. No. 11/863,202, filed on the same day as the instant application, and entitled "METHODS OF RANKING CONTENT FOR BRAND CENTRIC WEBSITES", each of which is incorporated herein by reference.

BACKGROUND

1. Field of the Invention

The present invention relates to methods for generating and managing brand data from various sources and to the access and management of the brand content by brand owner or brand managers.

2. Description of the Related Art

The computing industry has seen many advances in recent years, and such advances have produced a multitude products and services. Internet websites are examples of products and services, which are created to give users access to particular types of services, data, or searching capabilities. Today, websites can be readily created by most individuals desiring to post information or provide access or connectivity to other data. Websites are also created, updated, and supported to provide constantly updated current event information, news, and other information. This data is highly managed and processed so that its presentation can be easily displayed on web browsers or other Internet connected devices.

Currently to date, however, content data is presented on websites for specific content-type theme, and several brands may be presented (especially if the website is a commercial website). Although some media, news and entertainment websites attempt to cover lots of information and on many different topics, the content related to any brand mentioned on the site is only in limited scale. If users are interested in finding more information about a specific brand, the user must begin an intensive search for that brand content. Unfortunately for the user, the search of a brand may turn up many pages, websites, and sources that speak about the brand, but in order to gain the best understanding about the particular brand, the user will have to move from site-to-site, to assemble a full understanding or gain the information they desire.

The user, in this example, would feel disconnected with the brand, when all is said and done, and the user may find him or herself exhausted from the search and sometimes useless reading and web navigation. As a result, these users, although they may have an interest or desire to lean more about a brand, will not find the process inviting nor incite a connection to the brand. Furthermore, if other users also seek access to similar knowledge about the same brand, those other users will not have knowledge about others having or desiring the same experience. Consequently, user experiences regarding particular brands tend to happen in a relative vacuum.

It is in this context that embodiments of the invention arise.

SUMMARY

Embodiments of the present invention provide methods and computer implemented systems that provide content to be obtained, rendered, and produced to define a brand centric site, in the form of an internet site. The internet site will be accessible by any device having access to the internet, whether it be traditional desktop computers, wireless portable devices, televisions and any device capable of obtaining the content and displaying the content for user consumption. A brand centric site is a site generated by a system that obtains (or uses instances of) brand related data from disparate content sources over the internet, assembles the content at a centric and dynamic location, and enables interactivity and brand data contribution (in terms of content, feedback, ratings, postings, uploads, comments, etc.). The brand contribution can be by the brand owners, brand site managers, users, advertisers, etc. As the system pulls content from users themselves, disparate sites and data content channels, to dynamically generate brand sites, and users of the sites are encouraged to participate more and eventually grow into a passionate fan of the brand, as supported by the brand site.

A benefit of having users fully engaged in the brand is that brand owners will immediately have a pool of users that are likely to be receptive to new or additional brand products and services. The brand products and services may also be tangentially related products and services, which may see high reception from the fan base of particular brand sites. A benefit from the consumer's standpoint is, that the consumer feels in control of his participation in the brand site. For example, the consumer can rate content, cause content to be removed or promoted, the consumer can add his or her personal contribution to the brand site, and the community can monitor the brand site for content not acceptable to the site. Over time, users are also provided the flexibility to customize their likes and dislikes to cause changes to the presentation of the site content or deletion. If users are not registered to a particular brand site, the brand site will dynamically change in content and presentation depending on the community of user's feedback and interactivity. If a user is signed in to the site, the content and presentation can change in presentation or existence depending on the user's behavior or selected preferences.

By user behavior, it is meant that the system will monitor user activity and determine best placements and presentation of content, to best pull more user interactivity from the user. If the user is signed in, the content placement and its presentation on the site can be controlled by both the user's interactivity behavior and also by the interactivity of the community. In some cases, the user will only desire personalization based on his or her own preferences.

It should be appreciated that the present invention can be implemented in numerous ways, such as a process, an apparatus, a system, a device or a method on a computer readable medium. Several inventive embodiments of the present invention are described below.

In one embodiment, a computer-implemented method for defining access to brand related assets is defined. The method includes generating a website that relates to a specific brand, where the specific brand is associated with a plurality of assets that are integrated with the website, and the plurality of assets are obtained from a number of disparate sources. The method also includes assigning each asset an identifier, where the identifier defines a relation of each asset to the specific brand and defining a dashboard access to the specific brand. The dashboard access is configured to identify a user privilege for accessing specific ones of the plurality of assets of the specific brand, the user privilege enabling one or more of viewing details of an existing asset, adding a new asset, and modifying an existing asset. The user privilege for accessing specific assets enables management of plurality of assets that are integrated with the website, and the management of the plurality of assets overriding control of the plurality of assets provided by the number of disparate sources.

In another embodiment, a computer-implemented method for generating a brand site for an internet website and managing content of the brand site is provided. The method includes defining the internet website to include a plurality of modules, each of the plurality of modules for the internet website being directed toward a brand. And, identifying one or more instance sites where content components related to the brand are presented, then linking the content components, from the identified one or more instance sites, to selected ones of the plurality of modules, where some of the content components are generated by third-party content producers that are not authorized handlers of the brand. The method further includes assigning each of the content components an identifier, where the identifier defines a relation of each the content components to the brand or other brands. Further, the method includes defining a dashboard access to the brand. The dashboard access is configured to identify a user privilege for accessing specific ones of the content components of the brand. The user privilege enables one or more of viewing details of an existing content component, adding a new content component, or modifying an existing content component. The user privilege for accessing specific content components enables management of the plurality of assets overriding control of the content component provided by the third-party content producers.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

FIG. 5A illustrates a system diagram of components that are accessed interfaced to define brand content that is used to generate a brand site, in accordance with one embodiment.

FIGS. 10A-10C illustrate examples of ad content being associate with particular brand content, and its association across brand instances, in accordance with one embodiment.

FIGS. 11A-11E illustrate example advertising interfaces, in accordance with one embodiment.

DETAILED DESCRIPTION

Broadly speaking, the embodiments of the present invention provide systems and methods for enabling brand centric presentation, management, and interaction with media related to particular brands. Each particular brand is managed at and by a single brand site (referred to herein also as "brand universe" and "brand world"), that collects brand centric data, news, information, services, products, current events, user interactivity, etc., from disparate channels (other sites), and blends them together into the single brand site. The content obtained from other channels will represent an instance of the content, as that content can exist in both the other sites and on the brand site. Thus, updates at the brand site or at the originating sites will populate so that the best most current information is maintained in relation to a brand site.

Brand universe is a system that is designed to serve passionate fans of specific entertainment brands by providing them a single and immersive place to "hang out" together online. Brand universe is designed to meet a fan's emotional need for a connection with a brand in addition to filling a functional need for information or services. As these needs are filled, a unified interface to the brand is provided, which assists in deepening and strengthening relations with existing fans of the brand and also assist in introducing a unified brand view to new consumers. These new customers, by virtue of the dynamic experience, will be converted into fans of the brand. As users (e.g., fans) interact with the unified brand site(s), user interactivity can be tracked to develop metrics regarding uses, likes, dislikes, interactions, and commercial benefits to supporters of the brand (e.g., advertisers). This tracking of consumer/brand transactions will enable functional reporting of these metrics. These metrics can then be used by marketers of products related to the brand, to determine likelihood of success and revenue generation if products or services are marketed on particular brand sites.

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention. Several exemplary embodiments of the invention will now be described in detail with reference to the accompanying drawings.

The following description will be broken down into four parts, namely, a System and Functional Overview in (I), a System Management, Content Sharing and Content Contribution description in (II), a Partner Brand Owner-Handler Access and Management in (III) and a Brand Site Product and Computer-implemented Structure in (IV).

I. The Brand Universe System and Functional Overview

Figure 1:
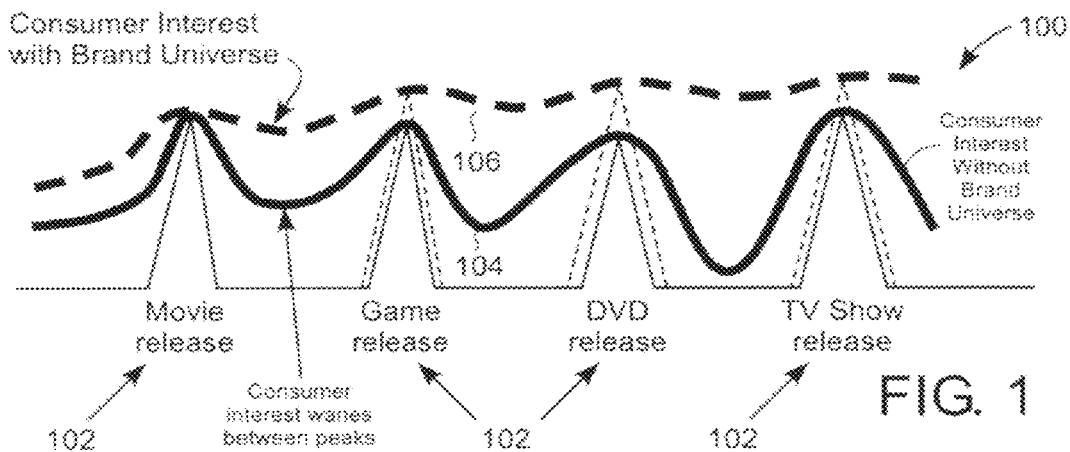
FIG. 1 illustrates how brand events shape or impact consumer interest, in accordance with one embodiment.

In one embodiment, a notion of brand universe is that it powers the place where users spend time between the major transactional events upon which their brand relationship is based. Thus it "fills in the gaps" in their relationship with the brand. This can be illustrated in FIG. 1, which defines a graph 100. Graph 100 defines release events 102 for different products of the brand, or services or media related to a particular brand. Consumer interest without brand universe support would be defined by plot 104, where consumer interest wanes between peaks, defined by the release events 102. Consumer interest with brand universe support is defined by plot 106, where consumer interest is smoothed out more, supporting those times between release events 106.

Thus, by providing a unified and dynamic brand site where fans can hang out online, brand universe smoothes the levels of consumer attention paid to a brand between release events 106 (e.g., transactional events), allowing a "base" level of attention that is higher than the existing state, as well as an ongoing means of communication regarding new brand related transactional opportunities, including micro-transaction opportunities that otherwise could not be effectively marketed. For example, the brand universe site can provide fans of Shrek™ with the ability to download a new Shrek™ 3 theme for their desktop. As a standalone feature, this type of transaction could not be efficiently marketed using television, outdoor, print, or radio, but could easily and efficiently be promoted to fans connected to Shrek™ through the brand universe site. In one embodiment, brand sites are defined from stitched together community features from across different content sites. By way of example, the content sites may be the sites created and managed by Yahoo, Inc.™ (e.g., Answers™, BIX, Flickr™, News, Forums, etc.). Other content can come from communities, news, feeds, etc., where such content is presently scattered among disparate sites and networked sources. Of course, the content can come from other sites not managed by Yahoo, Inc.™.

Figure 2:
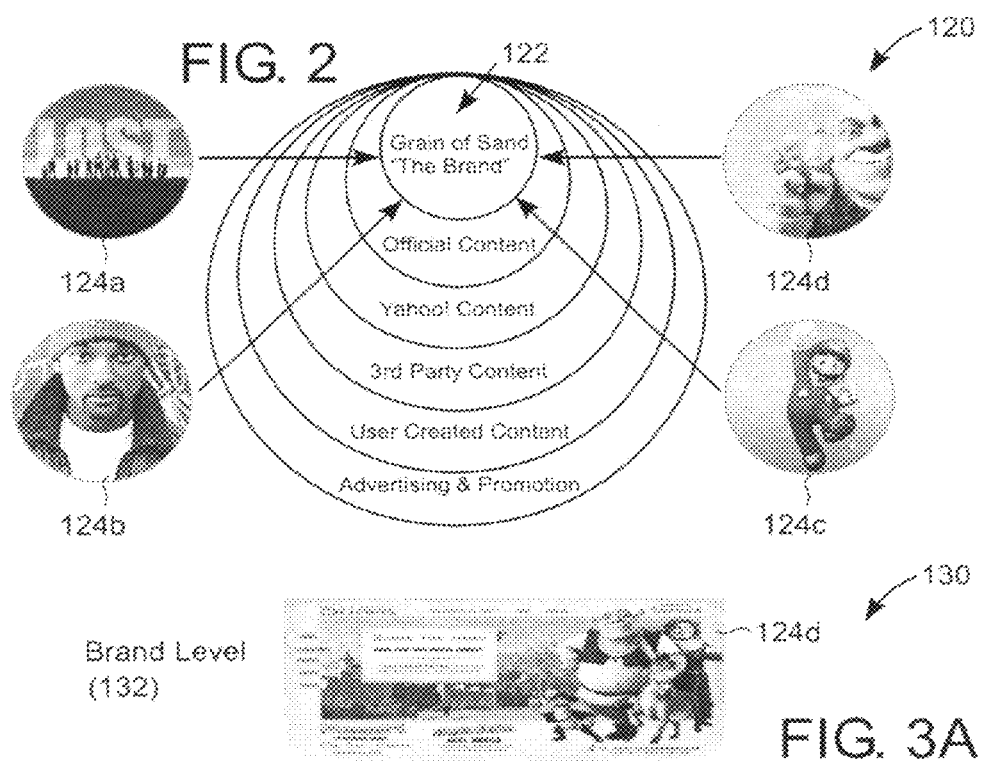
FIG. 2 illustrates layers of content that can be accessed to generate a brand site, in accordance with one embodiment.

In one embodiment, as brand universe places primacy first and foremost on the interest of the fan, the experience is always context-oriented versus category or function oriented. The brand is at the center and "build out" an experience around that brand. This is illustrated in FIG. 2, that defines a context diagram 120 for a brand 122. For each brand site or world, the context diagram 120 defines the various layers of abstraction, which all point to the brand 122. In this example, the layers include, without limitation and without restriction to ordering: (1) advertising and promotion; (2) user generated content; (3) third party content; (4) Yahoo! content; (5) official content of the brand; (6) brand content 122. For each brand site, associated with each brand, the layers of abstraction for context are applied. As shown, four brands 124 are illustrated, for which a brand site world is created. Brand site worlds are shown for: (a) a television show "LOST™" 124a, (b) actor "Will Smith" 124b; (c) "Nintendo Gaming™" 124c; and (d) the character "Shrek™" 124d.

Using the model of context diagram 120, it can be shown that an infinite variety of content and services may be built up around a core brand. However, in accordance with one embodiment, it is a goal to have the experience oriented around the subject brand versus the individual elements or other brands. This focus enables the brand site to "maintain an illusion" that the consumer is interacting with their brand, rather than utilizing a bunch of generic functions. For example, where compromises have to be made to test a new technology or to make an integration commitment, they should be made carefully and with a clear path to complete brand integration.

Major brands (e.g., products and/or services) have multiple manifestations in multiple media categories, and precise knowledge of these instances and their relationship to the brand world site (and to each other) is essential. For instance, it is not enough to know that Brand X has video games, a TV show, trading cards; but it is also essential to know each specific SKU, episode, card series, etc. This specific knowledge is preferred because it provides the basis upon which to track user interest and to drive transactions. This information also provides the mechanism where users can be made aware of additional brand related-content and services (i.e., Shrek™ 3 the movie is the entry point, but Shrek™ the brand site, incorporates the movie, the games, the merchandise, the videos, the mash ups, etc. and the Shrek™ community).

Thus, all accessible instances of the brand "roll up" (i.e., connect) to the "brand site", but the brand site is larger than the sum of its parts, as it offers the opportunity for fans to go beyond the tangible manifestations to the idealized, theoretical "essence" of the brand. For instance, Nintendo's™ "Mario™", shown as a brand site 124c of FIG. 2, may exist in many specific games, but the idea of Mario™ is bigger than any single game or group of games, and in fact has its own unique qualities in the mind of individual fans. The Brand universe system is working at its very best when it offer experiences and tools that allow fans to transcend the specific and move into the idealized or expanded concept of the brand via interaction with the system and with each other.

Because brand universe is configured to function 24/7, and with or without the help of the brand owner, the system is designed to generate a steady stream of high quality fan content. This stream, fed by the passion and creativity of the fan base, is one facet which "fills in the gaps" between traditional fan/brand transactions. As a result, fan content must not be treated as an afterthought of throwaway add on, but instead as the "star of the show". Therefore careful thought and attention is given to the "pull" components which generate the content and the "push" components which identify the best, and subsequently promote that content, both within the Yahoo™ Inc. environment and outside, via portable representations and viral components.

Specific reference is made to Yahoo's™ content, but it should be understood that the content can be managed by other entities, such as media companies, Internet companies, combinations of media and internet companies, and the like. Thus, although the brand universe system makes use of the media content already managed by sites within Yahoo™ Inc., these content sites should be viewed only as exemplary, as the system can well function when supported by other entities.

In one embodiment, it is important to have a correct sense of scale when pulling content from fans. To manage this, certain levels of interaction at the "instance" level are provided. For instance, the system will provide one set of interactions at Star Wars™ Episode 1™ HD-DVD; another for Star Wars™, Episode 1™; another for Star Wars™, the Original Trilogy™; another for Star Wars™, and another for Lucas Film™, and another for Chewbacca™ or Hans Solo™. Thus, the brand universe system is designed to precisely invoke fan content when it is most effective to the overall brand site. Effectiveness can be monitored based on user interaction or can be judged based on past performance on individual sites or on other brand sites.

Most interfaces around entertainment media objects throw an incredible number of choices at the user, usually in the form of countless tabs, links and promo boxes. A brand world site defined by the Brand universe system offers a simpler approach. Each interaction is carefully optimized to deliver the best possible user experience given what is known about the users needs, eliminating extraneous information and navigation in the process. At every step of the way, the brand universe system offers a "best guess" at the consumer's next need and makes that best guess obvious and inviting to the user via a large, highly visible promotion. By narrowing the "next step" invitation in this way, more time and effort is placed on this spot on the site. The brand universe system will therefore enable testing and tracking to fully understand the relationship between an offer and its context, in terms of generating user response.

In one embodiment, the interfaces provided by the brand universe system take the users' previous visits into account and will generate an appropriate reaction. Thus, the same content is not blindly promoted to the user and instead, by looking at what the user has already done and what has happened since they last visited, a best guess promotion is placed in front of them, to thus promote what they will want to do next. These are informed, personal guess—not just a list of most popular or most recent items, or items that strike the fancy of a human editor. The best guess promotion can be incorporated into each page of the brand site, not just top level pages, thus providing a full and rich interactive experience to the fan of the brand.

In one aspect of the system, the scale of promotion is responsive to individual tastes and visit histories. To fully customize the experience, the brand universe system defines creative page placement of content, which is auto generated. Promotional auto generation happens naturally through the addition of content, through the identification of content as particularly good or relevant, or in response to a marketing spend. The promotional engine is automated—creating units and placements on-the-fly as new material becomes available. The system also drives the inclusion of a specific sampling component that puts its own assumptions and biases to the test—giving new material a chance to be successful in "limited release"—and aids in early detection against new consumer trends.

The promotional system of brand universe is configured in an automated manner, but the system will enable human "overrides". Human overrides are important, as the system can grow and change in an automatic manner, as content data changes. However, promotion data can be added, changed, tracked and optimized continuously (e.g., daily, real-time, etc.). The promotion data can be provided by brand owners, brand fans, advertisers that see a possible link between their products or services and the brand or the brand's demographics.

The brand universe system, by its created brand sites can expose users to new brands that they might be interested in, but might have forgotten or not known about in the first place. The brand universe system is configured to do this naturally and on demand in response to partnerships with brand owners who want to create a higher level of visibility for their brands by "injecting" them into the system.

In one embodiment, and as a result, most promotional areas can contain a mix of paid and non-paid (i.e. best guess) promotion, though neither will be necessarily marked as such, particularly where endemic brands are concerned. One aspect of particular benefit to the brand site (generated by the Brand universe system) is that the mix between paid and non-paid placement is substantially balanced at all times. The user on a brand site should not notice or think anything is "wrong" (or forced on them) when an endemic brand is promoted for revenue related reasons. Thus, the integrate is natural, seamless, and more effective than simply placing a disjointed ad in front of a user. In one embodiment, all paid, endemic, non-media brand promotion in these mixed areas will keep users within the site, versus sending users to other sites (i.e. the user does not click on something that looks like an internal link and end up on an external site).

In one aspect of the invention, the brand universe system, for particular brand sites, can encompasses all entertainment brands and sub brands. From a promotional point of view, all brands are not created equal. Some will appeal disproportionately to certain segments of society, and where those segments are desired the Brand universe system places special automated emphasis. That is, the brand universe system self-adjusts to provide content on particular brand sites which best mesh with the expected demographic. By doing this, a brand universe site will be an inviting place to visit for users of the brand and the users can be best converted into more passionate fans. When users become fans, and the content is provided based on their likes, each brand site can market its content to enable maximum usage and maximum opportunities for revenue generation.

As activity is tracked, it is possible to know with great specificity what is hot at any moment in time relating to a given brand, for subsequent adjustment of a brand site by the brand universe system. In one embodiment, this information is fed to special programming sites (e.g., Inside Y! programming) so that it always reflects this specific knowledge, versus general promotional categories. For example, if someone types "Scarlett Johannson", the return should be the best option at that moment—i.e. "Scarlett Johannson in red at the Oscars™"—versus the generic "images, news, videos, etc." The search result should have the energy and the vitality of the moment vs. the dead feel of a reference book, so that the most relevant and up to the minute result is presented. This functionality, again, will turn users of the brand into fans.

Programming by the brand universe system takes time of day into account. The time of day should subtlety permeate the interface as well as the programming choices that are made. For example, after school, kid-friendly brands are emphasized while as the night goes on, brands with a mature nature may be more freely promoted.

Users influence the material programmed to them by implicit and explicit activity. The brand universe system offers users a chance to identify themselves as a "fan" of whatever they are looking at, be it a brand, an instance, or another user. In one embodiment, once they declare themselves as a fan of something, content deriving from that thing should "bubble up" to the top of their experience within the brand site.

As has already been mentioned, the brand universe system also tracks where a user goes and intelligently uses that information to make programming choices. For instance, a user that regularly uses movies Resident Evil™, Silent Hill™, and Alone in the Dark™ is clearly a fan of survival horror, so when a new franchise in this genre is created, the system will let him know. Knowledge of the user lets the system use programming to "sow seeds on fertile ground" connecting users to relevant brands rather than relying on sheer volume and brute force.

The mix of explicit and implicit inputs is designed to create a situation where a user is constantly surrounded by brands—some trusty old favorites, some of the hot new passions of the day, and others just coming up on the horizon; all moving together in orbit around the user to create a dynamic and totally personalized experience, as illustrated below.

The brand universe system provides several reporting concepts, in accordance with one embodiment. For example, brand level reporting is provided. The fundamental level of reporting is at the user/brand level. In one embodiment, every single discreet user interaction with a brand is recorded. These include but are not limited to: Visit, Pages viewed/editorial content consumed, Video streamed/uploaded, Files (image, flash, mp3, other) downloaded/uploaded, Prices checked, Contributions, answers, ratings, reviews, comments, postings, searches, etc. In a further aspect, the demographic profile of the user accrues to the brand during any interaction, thus creating a dynamic demo profile for each brand and for each interaction.

In still another embodiment, all activity needs to be viewed at the smallest instance level. For example, at the instance level of the DVD for Lord of the Rings™, which SKU (DVD Entity) generated the most activity, and within that SKU the content that generated the most activity with each segment, etc. For instance, I should know that in Lord of the Rings™: The Fellowship of the Ring area, males ages 18-22 are a particularly hot segment, but where fan art around that concept is concerned, the target age drops to 14-16. This data feeds our content acquisition engine. This also tells us what our "best offer" is at the instance and Inside Y! level.

In one embodiment, the brand universe system is configured to systematically identify up and coming brands. There are three ways in which this is done. First, whenever a new brand or instance of a brand is announced, the brand is tracked, months or even years ahead of its release. In this manner, it is known from the beginning and throughout the development cycle, how it is stacking up relative to other brands. Second, the programming system is continually sampling new items. Any major blips in activity, increased sampling, and pending sustained response may trigger an alert system. Thirdly, wherever possible, search must be mapped into the brand world so that it is possible to know exactly what users are looking for.

In one embodiment, all brand activity must be totally transparent in a relevant manner to each constituency of the eco-system. Consumers see the impact of brand activity in places such as top 10 lists, and in the programming they receive. Brand owners see the activity through widgets and real time reports that let them know how their products or services are positively impacted by the brand site. Other interested parties, such as retailers, analysts, licensees, etc. see their own version of the data.

The content creator (whether user or brand owner) may opt to buy, at the time of upload, a promotional package that will increase the visibility of their content. They may also do this in a systematic way by striking a larger relationship with the ad sales team which would "build in" promotion for a certain number of their assets, whenever they are available. Furthermore, a real-time reporting system will enhance the sense of excitement by demonstrating usage of the asset as it occurs, and providing a sense of the immediate impact of pulling a promotional lever.

Figure 3A:
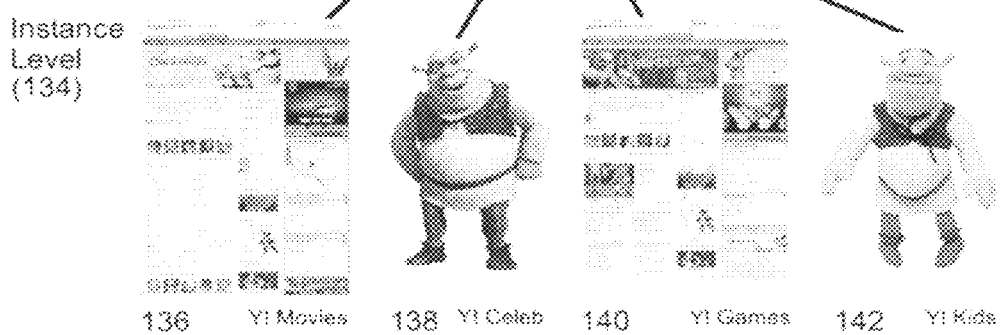
FIG. 3A illustrates an example brand site, which accesses instances of brand content from separate websites, in accordance with one embodiment.

The brand universe system 130 is, in part, built from instance levels as shown in FIG. 3A. In accordance with one embodiment, the instance levels 134 are accessed for their content and fed to a brand level 132, that defines a brand site for Shrek™ 124d, as noted in FIG. 2.

Specific instance levels 134, already having brand content, can be tapped to define a richer and more immediate experience at the brand site. The instance levels are also referred to as "verticals". The verticals are, on their own, separate websites that target a type of media. The type of media may be movies, games, etc, as noted in detail below. These separate websites therefore contain content for more than one brand, so long as the content is somewhat related to the media type. The brand content present on the separate websites, will therefore be referred to as instances, and such instances (i.e., brand content) can be shared with particular brand sites. The instances of the brand content, in one embodiment, will be present on both the separate website and on the brand sites, and any change to either one, may be synchronized.

The verticals should offer a best-on-the-internet experience around any particular instance of the Brand. If a user comes to Y! Movies 136 looking for info on Shrek™ 3, then the user will find it there, just as the will for Shrek™ Video Games within Y! Games 140. However, from either of these specific instances, the user may be invited to step into a Shrek™ "World" (e.g., the brand level 132) where Shrek™ is represented across instances. Once a user has taken a step out of the vertical (instance level 132) and into the world (brand level 132), all subsequent activity takes place within the world context, vs. the vertical (though the information is the same in both). Other illustrated verticals include Y! Celeb 138, Y! Games™ 140, Y! Kids™ 142, etc. Again, although the verticals are those provided by Yahoo Inc., the verticals can be provided by any media company or individual. In one embodiment, where a brand exists in a single category, then the "world" becomes the page within the vertical for that Brand. Still with this example, the TV show "Heroes™" only exists within Y! TV™, until such time as it branches out into other brands like video games, toys, etc.

In one embodiment and with reference to FIG. 3A, each instance of Shrek™ as represented in the verticals is "aware" that it is a part of the larger "Shrek™" concept, and thus, when a promotion occurs that is related to Shrek™ it can instantly populate across all related pages on all verticals with one command. This aspect is beneficial to promoting "micro" events because it touches every consumer that makes sense with minimal programming effort.

Beyond standard use cases, the brand universe system is designed to add an emotional edge. For instance: (1) Fan has five minutes to spend, what have we got? (2) Fan wants to extend that kick he gets from his favorite character on his favorite show, how does he do it? (3) Fan wants to be "on the inside" and "first" to see that new trailer, how do we make it happen? (4) Fans wants to "hang out" and relax with other fans, how do we enable it? (5) Fan wants to be recognized as a top notch fan, etc. (6) Fans want to make their brand a simultaneous communal experience, how can we make this happen? (7) Fans want to create their own ending to a movie, etc. Thus, the brand universe system meets a fan's emotional need and defines a connection with the brand, in addition to a functional need for information or services.

Still further, the brand universe system is configured with functionality to identify and recognize key brand site contributors. This feature is facilitated by providing greater access to tools and control over content on site, and by providing identifiers that set them apart from other members of the community. For example, being a "Level 10" member of the community or a "Lead Editor" of a show "#1 fan" of a particular brand. This leveling should reflect both explicit and implicit contributions to the site. The brand universe system also allows third-parties to log in and directly publish content to the site. Security is provided to ensure the right level of access is granted to the right user.

II. System Management, Content Sharing and Content Contribution

Figure 3B:
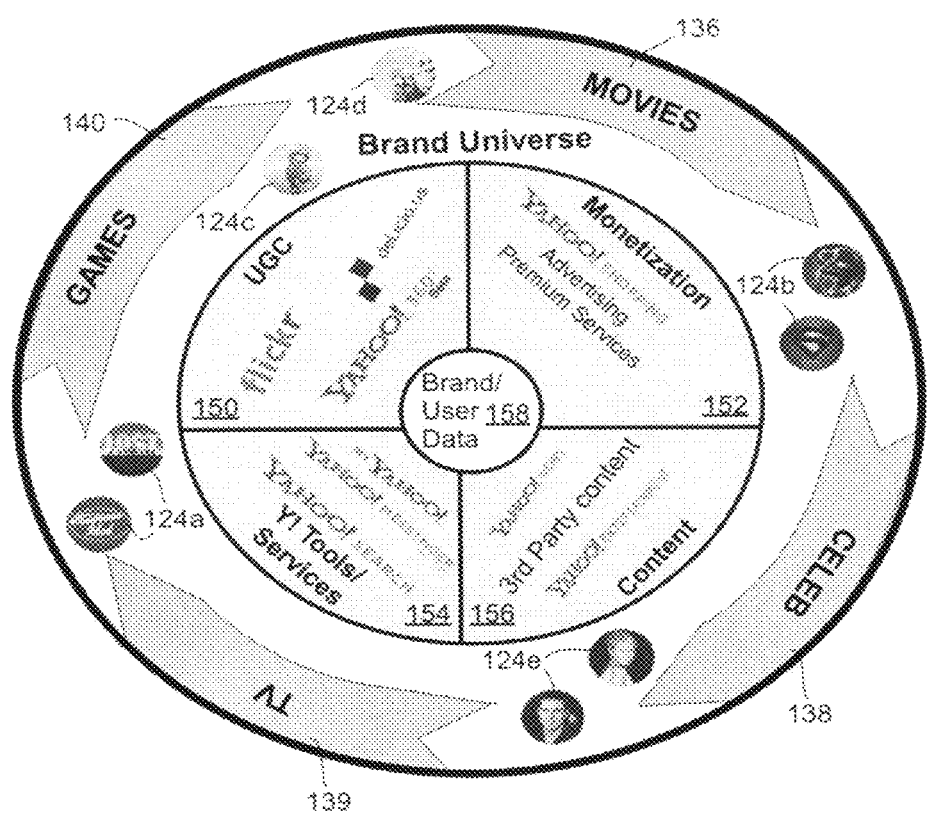
FIG. 3B illustrates an example of content that may be accessed to generate a brand site, in accordance with one embodiment.

FIG. 3B illustrates a brand universe system that feeds from disparate content providers, which also contain and manage content related to the specific brand. The specific brand is illustrated by brand/user data 158 cell at the center of the brand universe. One level of farming for content (related to each brand) may occur from instance levels (e.g., verticals), that in this example, are managed by Yahoo™ Inc. Of course, other separate websites, managed by other entities will work. Examples include: (A) user generated content (UGC), such as Flickr™ data, del.icio.us, Yahoo 360™, etc.; (B) Yahoo tools and Services, such as Yahoo Messenger™, Yahoo Search™; (C) Monetization, such as Yahoo Shopping™, Advertising, and Premium Services; (D) Content, such as Yahoo News™, $3^{rd}$ Party Content (e.g., current event data, RSS feeds), Yahoo Entertainment™, etc. This list was provided to give an overall flavor of the various data content sources and their function, and should not be restrictive, as they were provided for example purposes only.

Example brand sites are shown in FIG. 3B, namely television shows "LOST™" or "American Idol™" 124*a*, (b) celebrities "Tom Cruise™" and "Paris Hilton™" 124*e*; (c) "Nintendo Gaming™" 124*c*; (d) the movie character " Shrek™" 124*d*; (e) Action Heroes™ 124*b*, etc. These brand sites, as noted above, will also feed in brand content data from the various vertical sites (e.g., to obtain brand content instances (levels 134)). Example vertical sites may include, Movies™ 136, Celebs 138, TV 139, Games 140, etc. The brand sites, although they will share content with verticals, the brand site will provide a more complete brand world, as the brand sites pull (roll up) data from the various instance levels, while also integrating user data, user generated content, brand-centric user experiences, brand-related chat, brand merchandising, etc., to define the brand/user data 158 experience.

Figure 4:
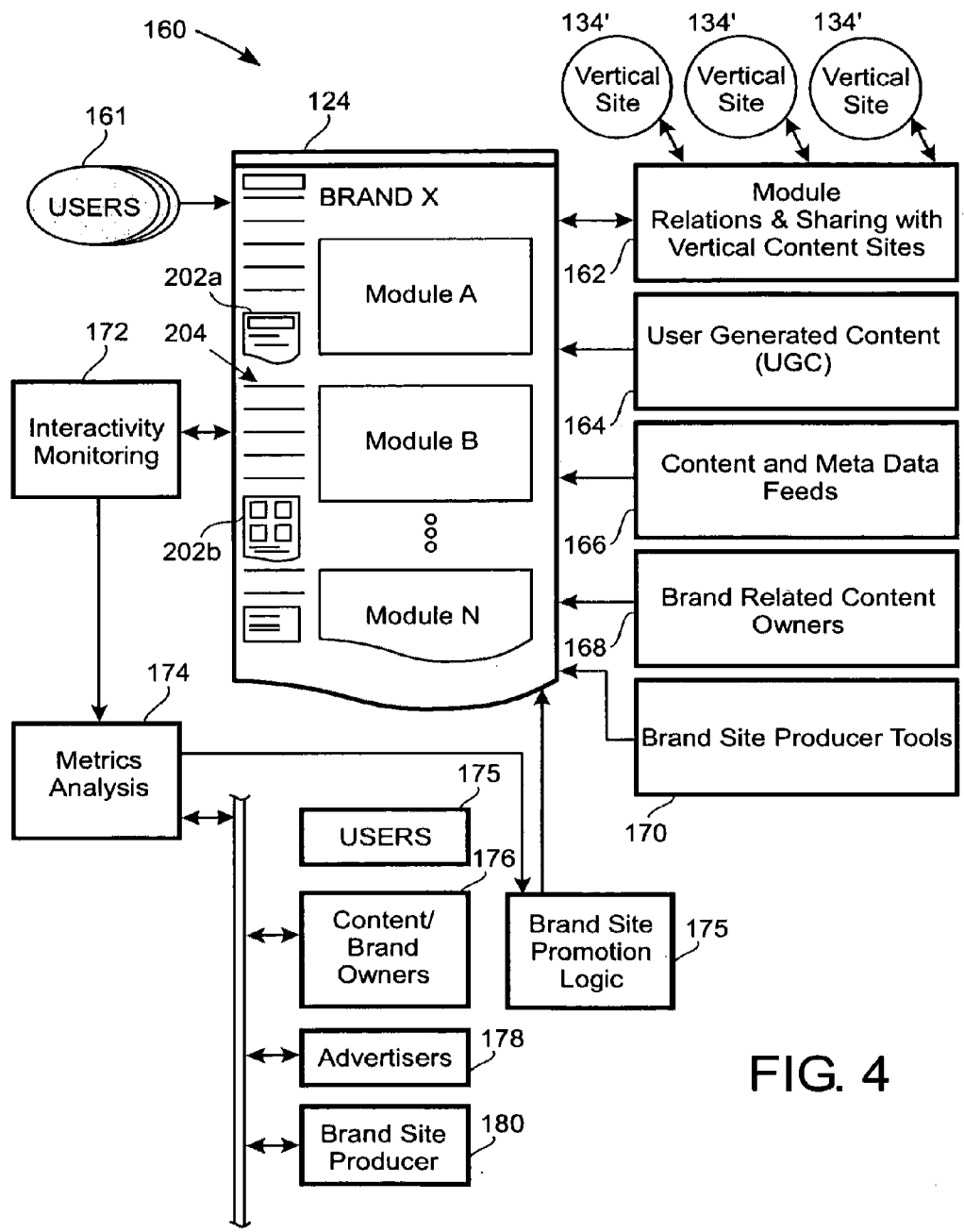
FIG. 4 illustrates a system diagram of the brand site components and modules, in accordance with one embodiment.

FIG. 4 illustrates a system diagram 160, in accordance with one embodiment of the present invention. System diagram 160 illustrates a brand site 124 that includes a number of components that make up the brand site 124, when implemented in accordance with one embodiment of the present invention. The brand site 124 is for Brand X, and the brand site is organized, in one embodiment, to include a plurality of modules. The plurality of modules are shown as module A, module B, . . . module N. In one embodiment, module definition and programming will simplify their integration into the brand site, so that APIs and pluggability enable fast and efficient publication and edits of new content, submission of new content, and overall management of the brand site content. In addition to the modules, the brand site 124 may include a number of other feathers such as advertisements 202*a*, user generated content 202*b*, and other images, icons, menus, or interactive features, in addition to text 204.

The various components provided around the modules of the brand site 124 are designed to seamlessly blend into the presented content that is brand-specific and targeted to the specific demographic for the given brand being rendered at the brand site 124. The brand site 124 is accessed by users 161 over the internet, and users 161 will be able to access the brand site 124 from any number of connected devices. The connected devices can include desktop computers, laptops, mobile devices, cell phones, personal digital assistants (PDAs), and any other device that is capable of accessing the content provided by the brand site 124. The various users 161 access brand site X at their convenience, and may also personalize their brand X site for their enjoyment or normal use habits.

In one embodiment, brand X site is also provided with a log-in module to enable a user to login with a user name and password to then access the modules of brand X, in a user defined presentation, that is most preferable to the specific user. Accordingly, the brand site 124 not only provides the dynamic information in a pre-defined format, but the format can also be rearranged and prioritized depending on the preferences of the specific users that may log into the brand site 124. Depending on user interactivity with the brand site 124 and the different modules of the brand site, the system 160 is configured to provide interactivity monitoring 172, that saves data regarding the monitoring to the metrics analysis 174 module.

The interactivity monitoring 172 is configured to monitor specific user's activity on the brand site 124 to capture preferences, user demographics, most frequently used content, identify when user generated content is supplied by the users, and navigational activity within the brand site 124. All of these metrics are provided to various components of the system 160. The system 160 is shown to provide access to the metrics analysis 174 to users 175. Users may access the metrics directly through the brand site 124 by way of displays that indicate popularity of specific modules, components within the modules, or recently viewed data by other users 161.

Additionally, metrics analysis may be provided for specific content parts managed by the brand owners 176. In this manner, metrics can be provided in a more granular manner, so that very specific brand content can be individually monitored, tracked, updated, changed, or eliminated, based on one or more decision factors. Such factors may be due to business reasons or user satisfaction or user dissatisfaction.

The brand owners noticing specific activity on the brand site 124, may find a need to develop additional modules for the brand site 124, modify the products or services rendered by the brand site 124, or introduce new promotions for the brand products or services. The brand owners would therefore get a substantially real-time view into the popularity of their specific brand, and could provide a viewpoint into desired functionality, or desired services that may be missing on the brand site 124, to thus provide additional monetization to the brand owner 176 (e.g., by selling (i.e., through e-commerce or non-ecommerce traditional store transactions) brand content services or products, or services or products advertised on the brand site). The metrics analysis 174 is also shown available to advertisers 178. Advertisers 178 desiring to inject their content into a particular brand site 124 would be provided with metrics that identify the popularity of the brand and other related advertising services or products.

For instance, if soft drinks are being advertised in a seamless manner in one of the modules of the particular brand site that related to sports, other drink type advertisers may see an advantage to also providing similar seamless-type advertising modules for the given brand site. The metrics could also provide data regarding access by users, susceptibility of users to access the specific advertisements, revenue generated by previous advertisers, and other metrics similarly usable by advertising companies. The system 160 could also provide access to brand site producers 180. The brand site producers 180 are individuals that manage the structure parts of the brand site 124, certain placement of modules within the brand site 124 (if promotion packages are paid), the organization of data, and the feed of some data in and out of the brand site 124.

By providing brand site producers access to metrics analysis 174, it is possible for the brand site producers to more fully understand the use and interactivity being experienced by users, and could also provide insights into improvements to further integrated the modules of the brand site 124 in a more seamless, or interactive manner. The metrics analysis 174 is also shown providing information to a brand site promotion logic block 175. Brand site promotion logic 175 is designed to intelligently read the metrics analysis 174, apply rules to improve promotions of specific items within the brand site 124, and in an automated manner, promote certain content within the brand site 124 to a more prominent role, or demote certain content either to less prominent roles. Additionally, the complete removal from the brand site may occur, depending on the user interactivity, and other metric analysis performed on the usefulness of the brand site 124.

Continuing with FIG. 4, the system 160 is also shown to include a block 162 that defines module relations and sharing with vertical content sites. Module 162 is designed to feed the brand site 124 with specific modules that may be obtained or shared with vertical sites 134'. As noted above, vertical sites may include other separate sites that share the content found on the brand site 124, and any changes made in either the brand site 124 or the vertical sites 134' may be seamlessly integrated and synchronized in relation to the features being shared. A block 164 is also shown providing user generated content (UGC). User generated content is that which is produced by users 161 and uploaded to the brand site 124. The user generated content may be simple feedback information provided by forms, menus, ratings, or actual interactive content (videos, pictures, data) produced by users and submitted for publication into the brand site 124.

Block 166 shows content and meta-data feeds that are also provided to the brand site 124. The content can include content found from third parties, such as user organizations, meta-data regarding those different pieces of content, and the like. By providing block 166 as an input to the brand site 124, the brand site 124 will appear to be receiving the most up-to-date information regarding the brand X. Block 168 provides brand related content owners access to portions of the brand site 124. Brand related content owners may be those which provide content that is not specifically about the brand, but is very related to the brand and thus can be provided to the brand site 124 for tight integration.

Figure 9:
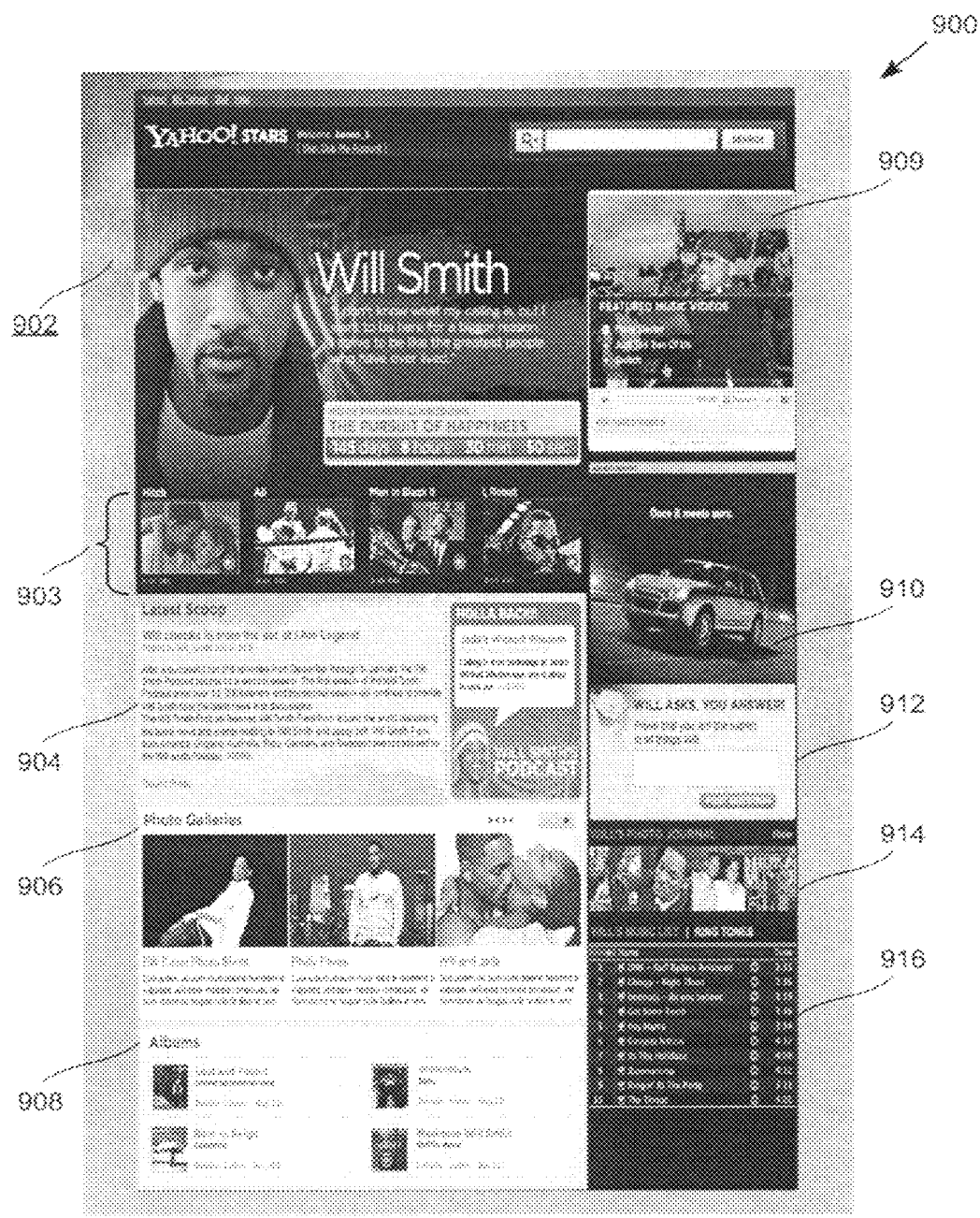
FIG. 9 illustrates a brand "persona" that is used to generate a brand site, in accordance with one embodiment.

As will be shown in FIG. 9, a brand-related content owner 168 may be the owner of the ringtones shown in the bottom right hand corner of screen 900. Although the brand owner (or persona-subject) in screen shot 900 of FIG. 9 is Will Smith™, the ringtones are not necessarily owned by Will Smith™, but they are considered brand-related content, and it is owned by specific companies that would like to provide such content to Will Smith's™ brand site 900. Next, is a brand site producer tool 170 block that provides brand site producers access to the brand site 124 to perform modifications, updates, retooling, and any other adjustments or updates that may be necessary in view of its structure, content, or organization.

FIG. 5A illustrates a system view diagram 160' for the brand universe system, in accordance with one embodiment of the present invention. The system view diagram 160' defines an entertainment content repository (ECR) 240 for holding data related to various brand sites. The ECR 240 will therefore store in a plurality of databases information regarding different brands, assets, relationships, meta-data, and other information that will link specific brand sites to the various components for obtaining the content and for presenting the content to users. In this example, the ECR 240 is shown interfaced with services 220.

Services 220 are shown to include, in this example, personalization 222, promotions 224, services interfaces 226, advertising 228, analytics 230, and Yahoo™ network services 232. These services 220 therefore provide the ECR 240 with access to brand-centric experiences in vertical worlds defined in an instance level 134. As noted above, the instance level 134 can include various sites that hold data regarding the specific brand site being created, managed and interfaced to the ECR 240. In the example shown, vertical sites include Yahoo games 140, Yahoo movies 136, Yahoo TV 139, Yahoo kids 142, Yahoo celebs 138, etc. The resulting example brand site 124d is the brand universe site for Shrek™, in this example.

The world for Shrek™ shown by the brand site 124d is the brand level 132, as previously discussed with reference to FIG. 3A. The brand site 124 is also illustrated by an icon in the ECR, as the brand site 124 stores information regarding the brand site 124d, as well as brand content instances 142, 138, which may be obtained from different vertical sites, mentioned above. Data related to different brand sites 124a, 124b, are also similarly stored in the ECR 240, for access by the various processing engines of the brand site universe system 160', in accordance with one embodiment of the present invention.

The ECR 240 is also shown to receive content 252 from various third party data feeds 254. The third party data feeds 254 can provide information such as TV guide information, gaming information, movie information, and thus populate that information to the ECR 240 as it relates to the specific brand sites with the ECR 240. The content 252 is, as noted above, added and managed by producer tools 242. The producer tools 242 can be managed by brand site producers 244. The brand site producers 244 may be charged with the organization, orientation, content, and placement of the various modules within specific worlds (brand sites). Interfacing with the ECR 240 is an internal recording block 250 and a partner dashboard 248.

Partner users and brand site managers 246 can therefore gain access to the various components and interfaces that communicate with the ECR 240. For instance, a partner dashboard 248 (e.g., user interface that is user accessible over the web) will allow advertisers or owners of specific brands marketed, displayed, or highlighted by brand sites to view the performance of brand sites, the various modules on those brand sites, or content on the specific brands based on user interactivity with the site. Internal reporting 250 will also allow brand site managers to make adjustments to the brand sites, depending on the performance as monitored by user interactivity, feedback and other metrics.

Figure 5B:
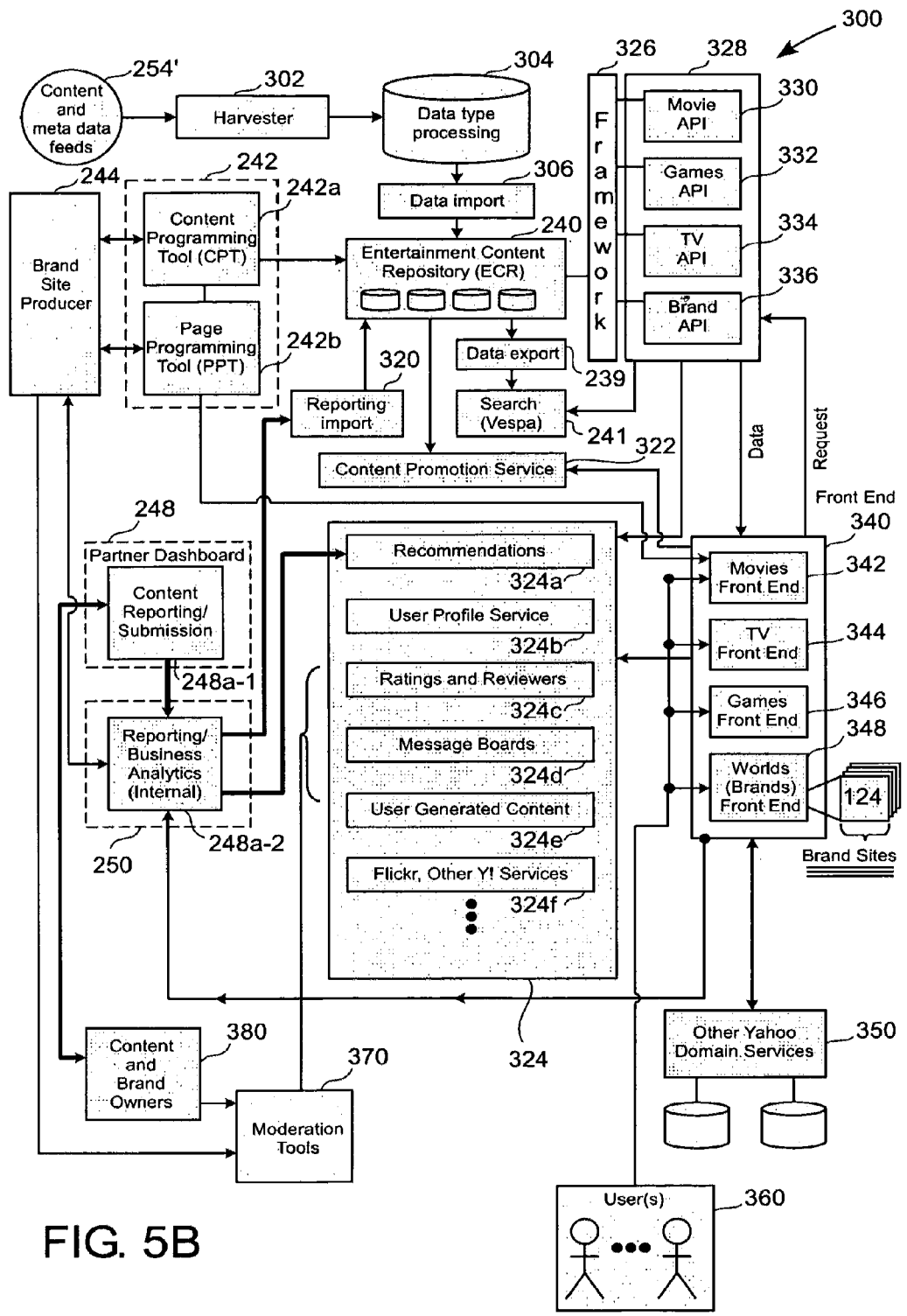
FIG. 5B illustrates a more detailed diagram of a system that manages access and data for generation of brand sites, in accordance with one embodiment.

FIG. 5B illustrates a brand universe system 300, defining additional aspects of content acquisition, content management, reporting, and presentation for brand sites, in accordance with one embodiment of the present invention. The entertainment content repository (ECR) 240 is shown receiving data from various components. One component is content and meta-data feeds 254'. The content and meta-data feeds may include user feeds and other data that is then forwarded to a harvester 302. The harvester 302 is configured to obtain the data from various communication data source connections (e.g., HTTP, FTP, and other communication protocols ports, formats, and links) and forward that data to a data processing block 304.

The data processing block 304 will identify the different types of data such as text data, image data, meta-data, video data, and other types of data so that data can be properly forwarded to a data import block 306. Data import block 306 is configured to forward and map the different pieces of data with appropriate identifiers, tags, and meta-data to the databases of the entertainment content repository 240. The ECR 240 is also interfaced with framework 326 that is coupled to API blocks 328. Example API blocks 328 are shown to include, in this embodiment, movie API 330, games API 332, TV API 334, and brand API 336. These APIs are configured to provide access to the different vertical instances (on the separate websites) where components of the brand are shared and obtained between the vertical sites and the brand sites managed by the brand universe system 300.

In this example, front end 340 is provided to enable users to gain access to the different vertical sites, such as the movies front end 342, the TV front end 344, the games front end 336, and the various worlds front ends 348 (brand sites). As illustrated, brand sites 124 are accessed through the worlds front end 348 that then provide requests to the API blocks 328, and data is provided to the front end 334 for display and rendering on a display screen of the various users. The API block 328 may also provide a search request to the ECR 240 through a search block 241 to render search results data back to the users interfacing with the brand sites or the various vertical sites associated with front ends 342, 344, or 346. The search block 241 is a search index that is re-populated on a regular basis via a data export 239 from the ECR 240. API block 328 then hits the Search block 241 with search requests.

The front end 340 is also shown coupled to other Yahoo domain services 350 that can provide additional data and information to the brand sites 124. The users 360 will therefore interface with the screens provided by the front end 340, to cause interactive use of the various brand sites. As users 360 interface with the different brand sites, the interfacing and interactivity with the brand sites and its content are monitored. A reporting/business analytics module 248b is provided to monitor the activity of the various brand sites as used by user 360.

The reporting/business analytics module 248b is internal processing (e.g., to the operator of the brand sites), and such information that is also used by the producers of the brands sites to improve the quality of the experience for the users (i.e., that are becoming fans) of the brands, and also make adjustments based on this information. The reporting/business analytics module 248b also provides an automated data feed to the recommendations block 324a. This recommendations block 324a is a recommendations algorithm/system that interfaces with the front end 340. The reporting/business analytics 248b is part of the internal reporting 250, as discussed in reference to FIG. 5A. The reporting/business analytics module 248b can be a separate system or integrated system, that takes user interaction data and ECR 240 data as inputs, and outputs recommendations based on user data. In one embodiment, the system can be an integrated platform tool or a third party tools that interfaces with the brand universe system 300. The partner dashboard 248 includes content reporting 248a-1 and submission 248a-2.

The content reporting block 248a-1 is a read-only interface for brand owners 380 in to the reporting/business analytics module 248b. The content submission block 248a-2 is an interface where content (images, videos, etc.) and data may be submitted by content or brand owners 380 to the ECR 240. The functionality of content submission is, in one embodiment, geared to drive the content promotion service 322. Brand site producers 244 can view, edit, or approve any submissions made by the content or brand owners 380 in the content submission block 248a-2. Once approved (or it can automatically be approved depending on the brand owner 380), the content can be automatically promoted by the content promotion service 322. As used herein, "promoting content" means that the content takes on a more visible position on the interface pages, so that more user traffic migrates toward the promoted content.

Moderation tools 370 are provided to enable the content or brand owners 380 and the brand site producers 244 to moderate the type of content posted as user generated content (UGC). If the user generated content or user feedback is posted on the brand site, and such content is offensive or destructive toward the brand in any way, as judged by the brand owners or brand site producers, then that data can be removed or adjusted.

In addition to recommendations 324a, other modules with processing logic that provide functionality include user profiling services 324b (e.g., "a user's recently viewed content (e.g., such as movies, games, TV shows, video clips, photos, etc.)", "most viewed/most popular content on a site, in the last hour, 24 hours, week, month, all-time", "most viewed/most popular content by audience segment (i.e. what movies are popular for 18-24 year old females)", "ad targeting based on a user's interest profile generated from what they view over time"), ratings and reviews 324c, message boards 324d, user generated content (UGC) 324e, Flickr™ and other services 324f. In one example, the moderation tools 370 can be used to moderate content submitted through 324b-324f. These services 324 are provided to manage, submit or present data, interactive menus, graphics, and other information that may be fed back to specific brand sites in the form of modules, content data, or supporting information for the modules for presentation on the brand sites. The brand sites will therefore be able to interface directly with rich content information that is up-to-date, provides user involvement, and enables further blending of the brand with the user's experience to assist in converting users into fans of a brand site.

Producer tools 242 are also provided to enable brand site producers 244 to interact with the content in the ECR 240. The producer tools 242 include a Producer's Desktop (PD) 242a, and a content programming tool (CPT) 242b that is interactively coupled to the ECR 240. The tools of 242a and 242b are provided in the form of interactive programs and forms that enable brand site producers 244 to properly manage their brand content as it is presented to the ECR, for then publication on the brand sites 124, when users 360 access the worlds front end 348. A content promotion service 322 is also provided and is shown receiving data from the ECR 240, and then interfaced with the front end 340 to provide the brand sites 124 with instant content promotion services, so that when users 360 are viewing the brand sites, certain content can be highlighted.

The highlighted content can be promotional information that is either paid for by advertisers in the brand sites, or can be promoted to a higher prominence on the page if users desire more functionality from specific components and modules of the brand site. These and other functionalities are provided by the brand universe system 300, in accordance with one embodiment of the present invention.

Figure 5C:
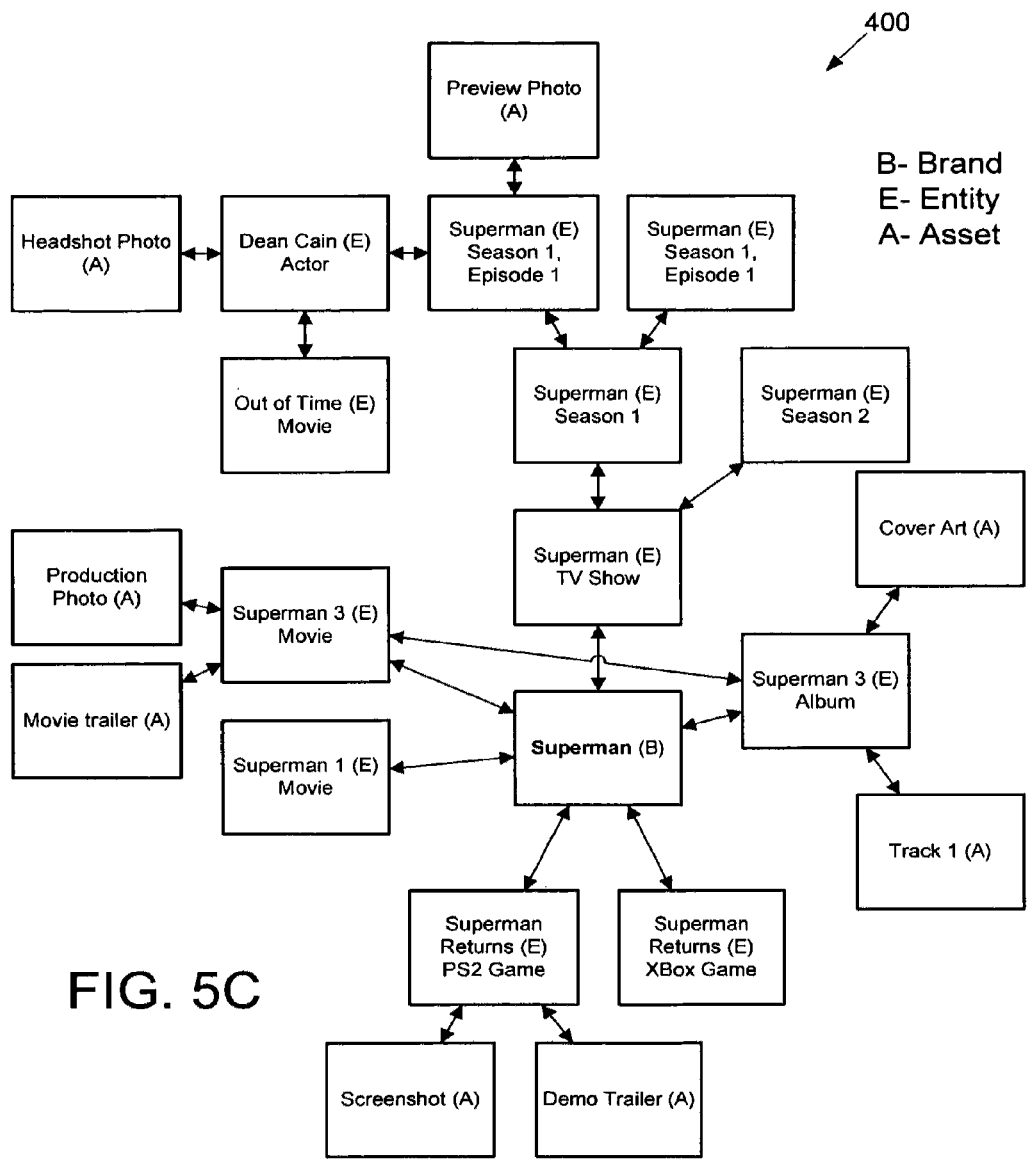
FIG. 5C illustrates a bi-directional graph of relationships, in accordance with one embodiment.

FIG. 5C illustrates a bi-directional relationships diagram 400 that defines how specific data pieces are interconnected to a specific brand to define modules or parts of modules of a brand site, based on information obtained from other sources. The bi-directional relationships diagram 400 is also referred to as web relationships that relates specific pieces of the web in terms of "degrees of separation". The graph therefore does not define a hierarchy with respect to components, but simply their inter-relationships. The various components that are interrelated and illustrated by the bi-directional relationships diagram 400 include entities identified by "E", and assets identified by "A". The brand (of the brand site) is identified as "B".

An asset is a piece of content that can be consumed such as photos, videos, new articles, and any other content that may relate to an entity. An entity is a specific person or thing that relates to the brand, and may also be related to other entities. For instance, the Superman™ TV show entity can be related to both the Superman entity season 1 and the Superman entity season 2. The Superman™ season 1 entity can also be related to other episode entities. Certain ones of the entities may also include specific assets. An example of an asset is shown as cover art or track information, which may be related to Superman™ 3 album entity.

Thus, the brand "Superman™" is able to identify its relations to specific entities, and the specific entities can also be related to other entities, depending on the content of the specific entities. The bi-directional relationship diagram 400 is shown to illustrate the dynamic web that is formed when a brand site, such as a brand site for Superman, is linked to the content instances present at other entities, and related to those entities by the relationship graph. As the content grows, additional links to other entities and assets can be plugged in to the appropriate location on the bi-directional relationship graph 400. Accordingly, the web nature of the relationships enables easy interrelationships to the data so that presentation can be easily integrated into the brand sites.

Figure 5D:
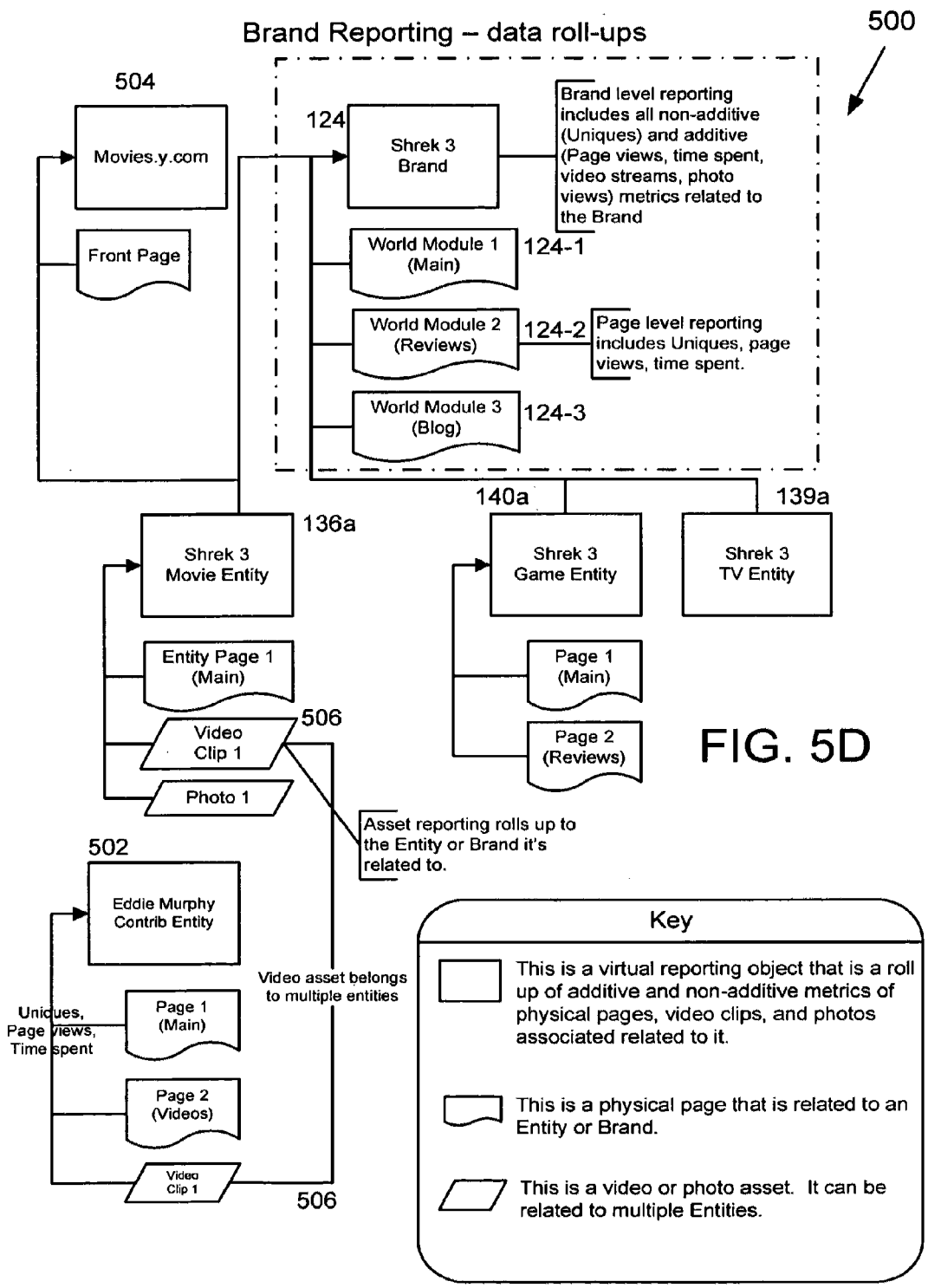
FIG. 5D illustrates related data and instances, in accordance with one embodiment.

FIG. 5D illustrates a brand reporting structure 500 for an example brand site 124. Brand site 124 is for Shrek™ 3. As noted, the brand level report includes all non-additive uniques and additive page views, time spent, video streams, photo views, metrics related to the brand, etc. As noted in the key of FIG. 5D, a square box is a virtual reporting object that is a roll-up of additive and non-additive metrics of physical pages, video clips, and photos associated to the object. The curve bottom box defines a physical page that is related to an entity or a brand. The parallelogram may define a video or a photo asset.

And, the asset can be related to multiple entities. The Shrek™ brand 124 is shown to include a number of modules 124-1, 124-2, and 124-3. 124-2 is a module-level reporting that includes uniques, module views, clicks, and time spent. Module 124-1 may be regarded as a main module, but the main module may be promoted or demoted, depending on various factors, as noted above. Module 124-3 may be a blog module that would enable users to blog (comment) about different aspects of the Shrek™ 3 brand site 124.

In this example, Shrek™ 3 the movie entity 136a, is shown directly related to Shrek™ 3 brand. Shrek™ 3 the movie entity 136a, includes an entity page 1 which is the main page for the movie entity 136a. Asset 506, which is a video clip 1, is also shown to be part of the movie entity for Shrek™ 3 136a. In addition, video clip 1 506 is also part of an asset that relates to the Eddie Murphy contribution entity 502. The Eddie Murphy contribution entity 502 may include a page 1 which is its main page, and would provide some uniques, page views, and time spent. The Shrek™ 3 game entity 140a is also shown related to the Shrek™ 3 TV entity 139a, which also relates to the Shrek™ 3 brand 124.

The Shrek™ 3 game entity 140a would include its main page and reviews. A movies entity 504 would include its own front page, and could also be related to the brand 124. In addition, the Shrek™ 3 movie entity 136a would also be related to the movies entity 504. Accordingly, an advantage of the brand universe system is its ability to tap into the content of related entities and the assets of those related entities to populate the brand site in a modular form that dynamically utilizes those assets when those assets are related and linked to the brand.

Figure 6:
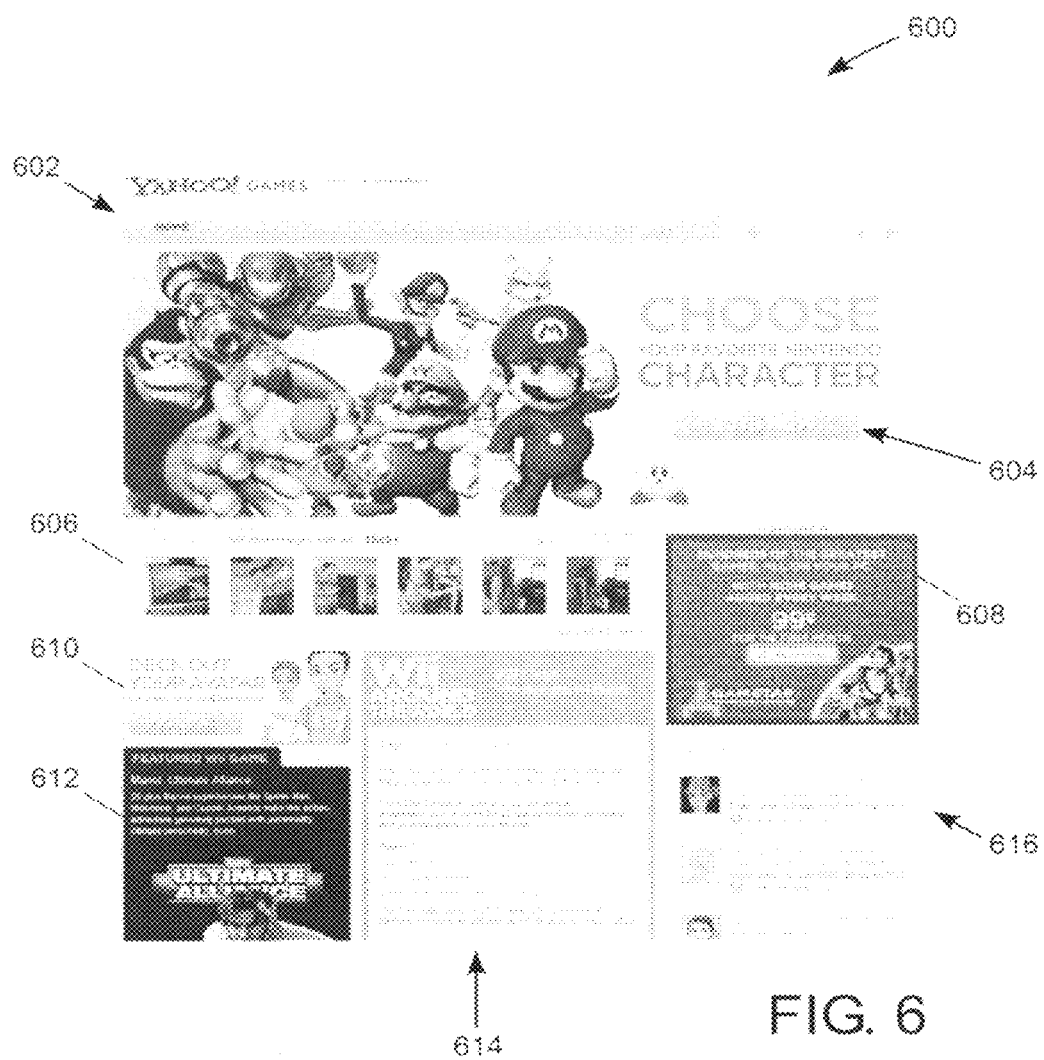
FIG. 6 illustrates an example brand site, in accordance with one embodiment.

FIG. 6 illustrates an example brand site 600, in accordance with one embodiment of the present invention. Brand site 600 is an example brand site that incorporates various entities and assets to seamlessly display the information on a brand site that links data (or shares an instance) from the various verticals and other content producing entities.

The resulting brand site 600 has a focus, in this example, around the computer gaming console brand "Wii™" by Nintendo™.

The brand owner Nintendo™ may or may not participate in the generation of the brand site 600, but brand related information from various entities, and its assets, will be seamlessly compiled and presented in module form into a seamless display that is all brand-centric to create brand fans. In this example, the highlighted module is a module called choose your favorite Nintendo™ character, and allows users to vote 604 regarding their selected favorite character. A photos module 606 is also provided to enable users to post their own photos (or view photos of others) and share experiences (in a community environment) regarding the Wii™ video game console and its applications.

By allowing users to post photographs regarding their experiences with the Wii™, the site provides a means to engage the users and give them ownership regarding the content of the brand site 600. In one embodiment, a photo capture and tagging application, such as Flickr™ (or other photo sharing and tagging site) may be used by users to capture images regarding their use of Wii™ products and games and post their photos to Flickr™ to enable upload to the Wii™ photos module 606 of FIG. 6.

Additionally shown is a module that will enable users to deck out their avatars 610, and the avatars can be decked out with Wii™-type clothing or styles. The concept of an avatar is a make-believe character that can take on a persona and be dressed or styled in a certain manner. The avatar may be owned by a user, and the user may wish to dress the avatar or provide the avatar with Wii™-type equipment, clothing, or the like. The module 610 although relates generically to avatars, its integration into the brand site 600 is brand-related due to the ability of the decking out avatars with Wii™-type products and services, and thus, is related as an entity and possibly an asset to the brand site 600.

Feature games module 612 also provides a link to a games vertical site that feeds 612 (or provides access to an instance of the same brand content), into the brand site due to its relationship, and also may exist at the vertical site at the same time. An advertisement 608 is integrally placed within the brand site 600 and provides relationship to the content of the brand site. Advertisement 608 relates to gaming and users viewing this gaming information on a brand site 600 related to the Wii™ gaming console would view the advertisement information with relevance as opposed to distraction, as is common in other sites that advertise unrelated goods and services to the content of a page. Module 614 provides Wii™ links around the world.

In this example, module 614 is a dynamic link portal that identifies websites that have been tagged as relating to the Wii™ product or service. For example, a service called delicious (del.icio.us™) is a program site that allows users to tag certain web pages and sites, and then search the web for web pages and sites that have been tagged with certain tag identifiers. In this manner, a user can access a number of related sites that are tagged with information that define their content or part of their content, as related to the brand site 600.

Additionally shown is module 616 that provides answers to questions posted by users regarding the Wii™ product and services. Thus, the module for answers with entries related to the Wii™ product are also made and included into the brand site 600. The brand site 600 also includes a navigation bar 602, for example, which allows users to navigate to other pages within the brand site 600 to further focus on other categories of the same brand, as represented by different pages, which are also built by modules and advertisements which all relate to the same brand information, or provide additional characteristics for defining aspects of the brand. Examples provided in the navigation bar 602 include a home page, a Wii™ info link, a games link, a message boards link, a videos link, a buyer's guide link, and others.

Figure 7A:
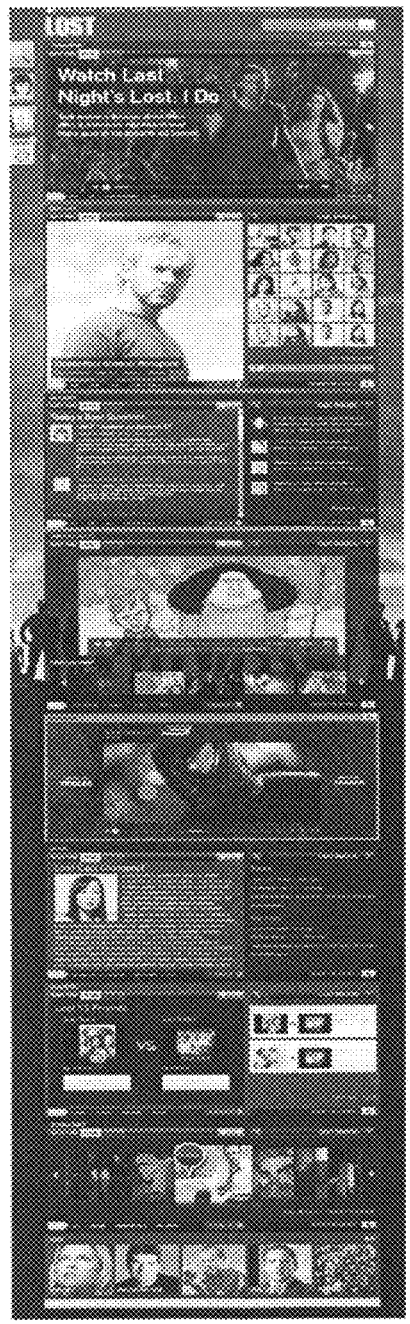
FIGS. 7A-7C illustrate example brand modules used to define a brand site, in accordance with one embodiment.
Figure 7B:

FIGS. 7A and 7B provide examples of brand sites that are constructed by assembling modules (stacked vertically in this example), that can be placed at various levels within the brand site and moved up (promoted) or moved down (demoted), depending on user interactivity, brand owner preferences, or brand site producers. The various modules, as noted above, can be moved up or down to emphasize their more relevant nature as compared to other modules within the site, and can also be demoted and moved off of the site, depending on their usefulness, interactivity metrics, and other measuring criteria.

When advertising modules are integrated into the brand site, such as advertising module 710, the module is represented in seamless manner with other content information, so as to make the advertising information blend seamlessly with the content, and so as to not obscure the experience for fans of a particular brand site. The modules are also represented in a form that provides an entertainment value to the user of the brand site, such as by providing video clips, recent activities that may relate to user questions, postings, allowing users to vote in regard to their preferences, and other information.

In one embodiment, module 714 may provide a lot of user interactivity during the module's lifetime on the brand site. For those modules that have high user interactivity, one embodiment would blend in advertisements in between content so that user sifting through content will periodically run into advertisements that blend in with the content being viewed or desired to be viewed by users. In this manner, the advertisement is presented to the user in a seamless manner that is not an obstruction or distraction to their intended use of the content. Referring to FIG. 7B, a user can be provided with advertisements such as movie trailer 740, which blend and appear to be just another module of the site.

The brand site of FIG. 7B is for transformers, and the transformers can have various types of content that allow user interactivity to further connect with the user's likes, dislikes, and increase their fan level associated with the brand.

Figure 7C:
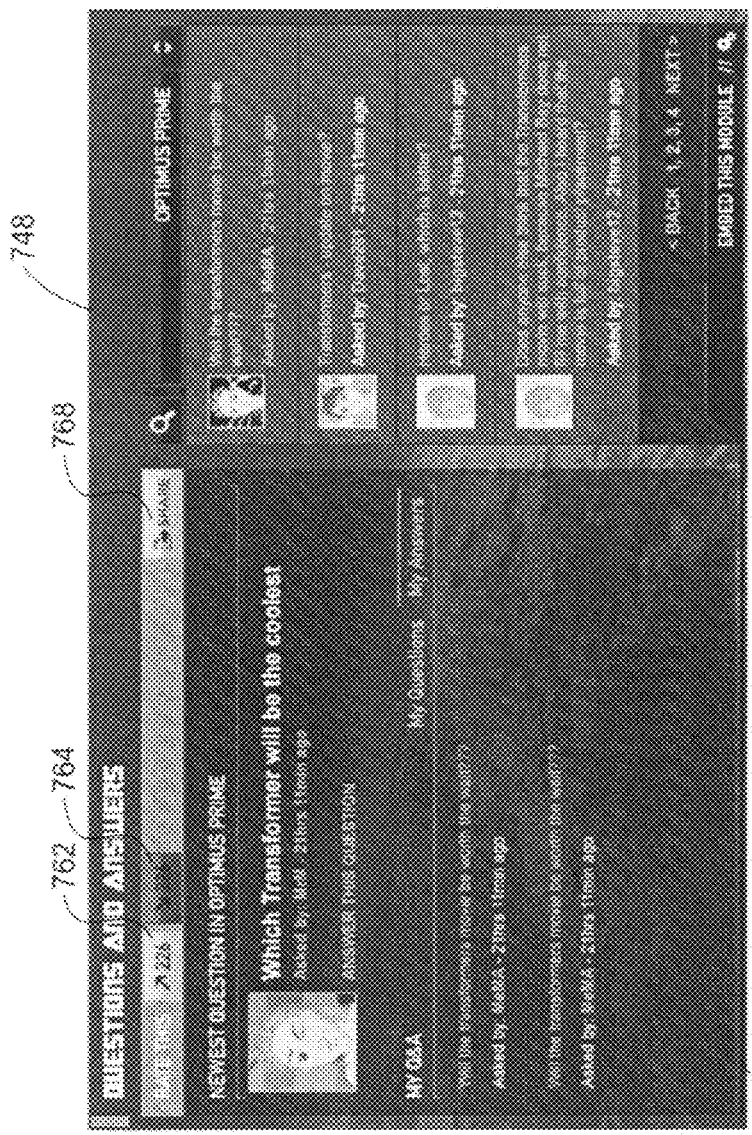

FIG. 7C illustrates and example of a module 748 from FIG. 7B. In this example, this module allows users to rate the various modules that make up the brand site. As shown, a bar labeled "rate this" allows a user to select button 762 or button 764 to indicate whether they like or dislike a particular module. If more users dislike than like the module, then the module may be demoted over time to a less prominent location on the brand site. In another embodiment, the module may be removed completely from the brand site in response to users voting the module off the site.

Modules which provide a high level of satisfaction to users, would be rated higher and possibly moved up in prominence on the brand site. Thus, module 748 is considered to be an interchangeable and pluggable module 770 that is capable of being integrated into the world site and moved up and down, depending on its prominence, based on user interactivity.

Figure 8B:
FIGS. 8A-8B illustrate examples of brand sites and advertisement integration, in accordance with one embodiment.
Figure 8A:
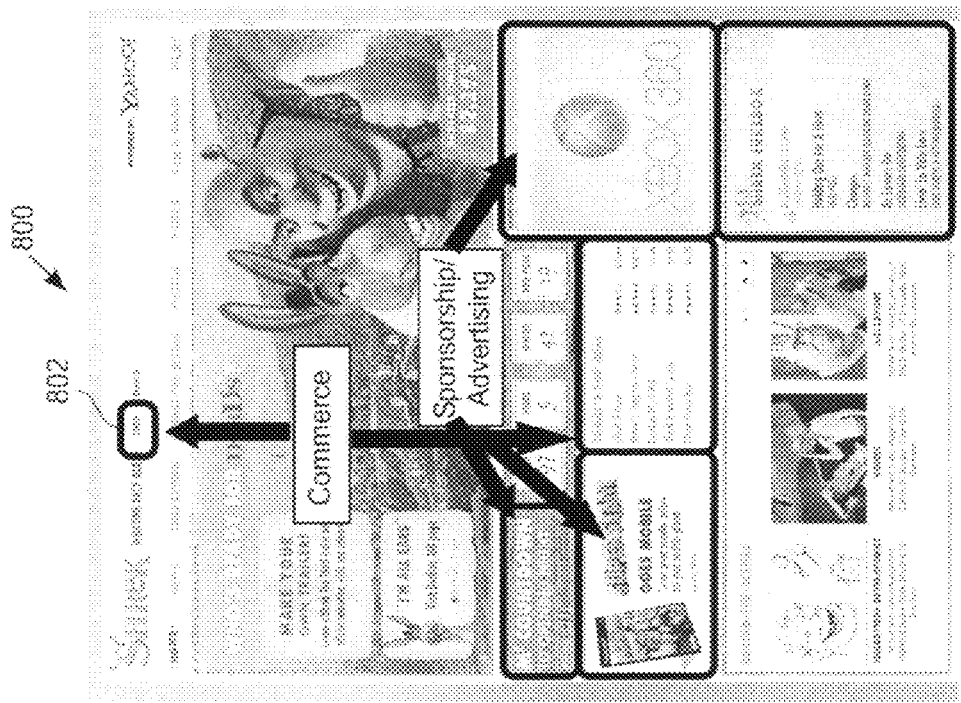

FIGS. 8A and 8B illustrate examples of a brand site for Shrek™, in accordance with once embodiment of the present invention. The brand site 800 of FIG. 8A illustrates examples of commerce transactions that are possible through the brand site. A shop icon 802 is provided to enable users to shop for Shrek™-related products or services. Additionally, sponsorship and advertisements can be provided on the same brand site 800 as those sponsorships and advertisements relate directly to the brand Shrek™.

A viewing of the brand site 800, as it relates to the sponsorships and advertisements, will illustrate a similarity in the products and services that relate to Shrek™, and their integration into the brand site do not detract from its usefulness and user desire to navigate through the content provided by the brand site 800.

FIG. 8B illustrates a brand site page that would enable users to connect to a Shrek™ fan club 822. By connecting to the Shrek™ fan club 822, users will join a club that will provide them with additional access to content, new releases, and information regarding their brand. In essence, by providing users with a club-level commitment by the brand site, the users are converted from basic users and move into a fan level, thus increasing their interactivity with the site.

As users grow closer to the interactivity of the site, users are more likely to purchase products or services related to the brand due to their "taking ownership of" the brand and committing to its products and services. As an example, users that may be part of the Shrek™ fan club could be provided with additional cell phone 824 content, special web page content 826, and special access to avatars 828.

FIG. 9 illustrates a brand site 900 for the actor Will Smith™. The actor Will Smith™ 902 is shown in a prominent location on the brand site 900 in a module located at the topmost portion of the page. A movies module 903 is provided in the brand site to enable access to clips, or movies in which Will Smith was an actor, and provides a direct relationship to the brand site 900. Module 904 is geared to provide the latest information by the actor to its audience of the brand site. As shown, Will Smith™ logged in to the brand site and provided information regarding his activities from the set of "I am legend".

This module provides users with a deep connection to the actor Will Smith and his persona, and his current activities. Another module 906 provides a photo gallery of different photographs in which Will Smith™ is captured and associated descriptions of the photographs are provided for Will Smith's™ audience. An album's module 908 is also provided that provides links to albums produced by Will Smith or in which Will Smith™ had some original contribution for, as it relates to the brand Will Smith™. Along with the modules providing information, and media which users may purchase, users are also provided with other modules in which advertisers may seamlessly integrate their products and services in a user friendly manner. For instance, module 910 is integrated into the brand site in close relation to Will Smith's™ movie clips, which makes the advertisement flow to the user of the brand site.

A module 912 is also provided to enable users to post their questions related to some content or activities or content provided in the brand site 900. A photos gallery is also provided in module 914, and a ringtone and music list is provided in module 916. Module 909 also provides a featured music video that can be played while users visit the brand site 900. The various modules that make up the brand site 900 therefore define the brand universe system's ability to access content from vertical sites (i.e., use or share instances of the brand content) and obtain dynamic data and feeds into the site to make the site appear, and function as an up-to-date portal of information that is composed of information continuously generated and submitted by the brand owners, advertisers, and users.

In still another embodiment, the brand site is more than just a site, as brand experiences can be distributed through out the internet. As one example only, a blogger can add a video module on a blog about the brand or related site. This brand related content is thus integrated with the brand site.

FIG. 10A illustrates a movie site 136 that can display a number of movie parts 960, that relate to different movies being presented on the movie site 136. As noted above, this may be a vertical site that targets a particular media type. Additionally, a user may decide to post advertising for a specific movie or relate advertisements to a specific movie on the movie site 136. In this example, the Shrek™ movie content 136-1 is shown in the movie site 136. Additionally, an ad posting 952 which may have been posted to the movie site, by virtue of advertising through a brand-related posting, will be linked to (or associated with, or placed beside) the specific movie content.

FIG. 10B illustrates a game site 140, where game parts 962 are illustrated, as well as a Shrek game content 140-1. If the user has selected to advertise for a selected brand, the user's advertising posting 952 may also be correlated to the Shrek game 140-1, as shown in FIG. 10B. The associating may be by virtue of placing the advertisement beside the Shrek™ game, or blending the advertisement with portions of the Shrek™ game, in between games, in between game levels of a game, etc. Any number of associating techniques may also be used, so long as a brand association occurs when a posting is set to relate to particular advertisements of specific brand parts (that may be present on the various vertical sites).

Additionally, FIG. 10C shows a brand site 124. The brand site 124 may also include content parts from the various sites, such as the movie site 136 and the game site 140. In this example, the Shrek™ game 140-1 and the Shrek™ movie 136-1 is part of the brand site 124. Still further, the brand-related advertisement that was posted 952, is also shown in association with the component parts of the brand site. For instance, if the user desired to post a brand advertisement for the Shrek™ brand site 124, that advertisement may also be populated to the various individual websites that also contain the Shrek™ content. In one embodiment, the user may be allowed to select whether to post the advertisement in the entire interconnected web of websites, as well as the brand site, or only in particular websites and the brand site, or combinations thereof.

FIG. 11A illustrates an advertising management site 950 that has various options to allow advertisers to access site metrics, post advertisements, manage their advertisements, and relate advertisers to certain brand elements, in accordance with one embodiment of the present invention.

The advertisement management site 950 shown in FIG. 11A has a brand site selection 956 region that allows advertisers to select brand sites that may be of interest for advertising. In one example, an advertiser may access the advertisement management site 950 and use selector 957 to select the brand site Shrek. If the advertiser selects the brand site Shrek™ using selector 957, the advertisement management site 950 may display another page as shown in FIG. 11B.

FIG. 11B illustrates a page of the advertising management site 950 where the user/advertiser is provided with related site 958 information and advertisement submission and format 960 features. In one example, the related site 958 identification will display the various websites that contain Shrek™ material. In this example, other websites that may contain Shrek™ material may include a games website, a movies website, and others. As shown, the user has selected, by checking boxes for advertisement, advertising in the game site, and the movie site. Before the user advertises in these particular websites, the user is also provided with advanced options 959, that allow the user to determine other advertisement options presented by the advertising management site 950.

The advanced options may provide information regarding page usage by users, previous advertisers, rates for advertising, special programs, etc. Of course, any number of other options may also be provided using the advanced option feature 959. In one embodiment, the features and options are presentable for each particular website or brand site. Further, the user may be allowed to post advertisements using the advertisement format 960 feature. The user may be prompted to select the type-format of advertisement that they wish to post.

For instance, the user may be provided with selection menus that will allow the user to identify and select banner types, clip videos, pic-photos, animated ads, and the like. A number of other screens and menus (not shown) may be provided to allow the user to format and post the particular advertisement for the specific brand site and websites having brand content.

Figure 11C:
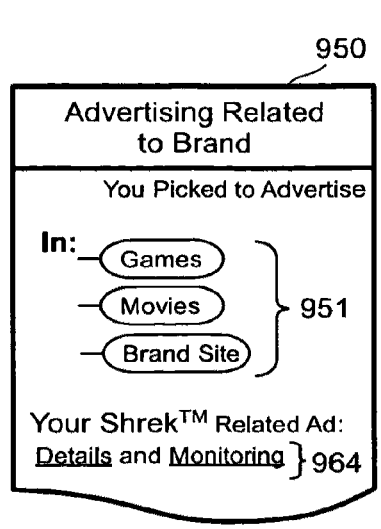

FIG. 11C illustrates the advertisement management site 950 where a user that has advertised on the site is provided with information regarding the advertisement activity. In one example, the user is provided with a listing of sites as well as the brand site 951, where advertising will occur in relation to their desires to post advertisements for these particular websites, as well as the brand site. The user can also be provided with advertising owner tools 964. The advertising owner tools 964 allow the user to see details regarding their postings for the specific brand site, and the website containing the components of the brand.

The owner tools 964 may provide additional details, and monitoring methods that define user activity in relation to their advertisements, and other e-commerce related information. Accordingly, the user (e.g., ad owner) may be given instantaneous access to determine whether their advertising for the specific brand and in a specific website, is providing a return as expected, based on prior use metrics, current use metrics, or other information.

If for instance, an advertiser places ads in one site, two sites, or multiple sites, and/or also a brand site(s), the use metrics can be broken down in a number of ways. The advertiser can be provided with detailed metrics for single sites, multiple sites, multiple brand sites, or a combination of all. Consequently, the advertiser is able to obtain rich information that is broken down into the best way understood by the advertiser and will allow for intelligent decisions regarding the placement of further ads, renewals, cancellations, etc.

Figure 11D:
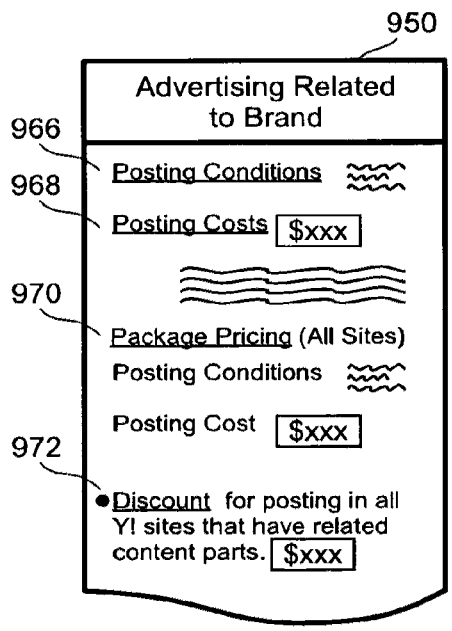

FIG. 11D illustrates an example where a user may be provided with a posting conditions region 966, a posting cost region 968, a package pricing region 970, and a discount region 972. These different regions may be provided to the ad owner (or marketing professionals) as additional ad owner tools that allow the user to determine what the conditions are for the posting (e.g., posting contract), as well as the cost associated with posting an advertisement in each of the websites, as well as the posting in the brand site. Additional features may include the package pricing capability that will allow a user to post one advertisement associated with a particular brand, and that advertisement is automatically populated to all instances of the brand throughout the various websites.

Additionally, the user may be provided with discount information for pricing associated with package postings. E-commerce transaction screens may also be provided to allow the user to submit content, format content, pay for content, monitor demographics associated with their postings, and monitor income generated from user activity.

Figure 11E:
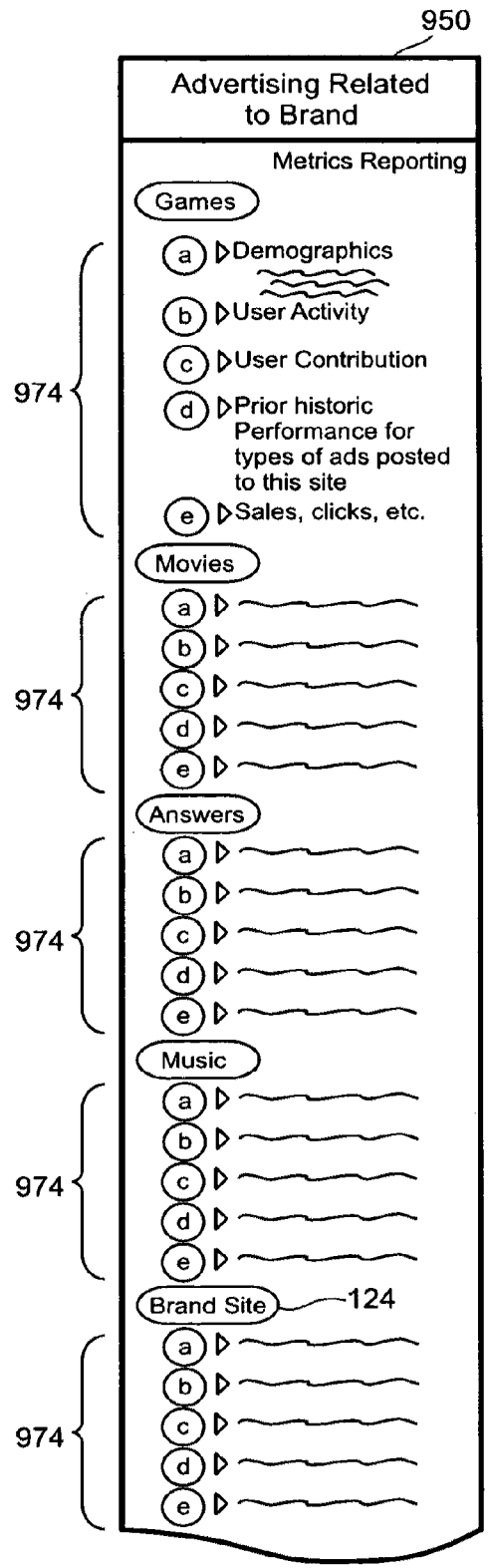

FIG. 11E illustrates a metrics reporting screen that may provide yet additional information to the user that is posting advertisements on the brand sites. The advertiser may be provided with detailed monitoring 974 that may be granularly displayed for different aspects of the various websites, as well as the brand site. Example metrics may include demographics of users accessing the specific websites, the user activities on those websites, the user contributions to those websites, prior historic performance for the types of ads posted on these websites, previous sales, clicks, and other metrics associated with determining whether advertisements are performing or not.

These detailed metrics 974 may also be provided for the brand site, as specific advertisements may also be joined or placed in close relation to specific portions of content on the brand site. For instance, an advertiser may wish to have his or her brand advertisement placed next to music type content. Or, the advertiser may wish to have his or her advertisement always placed closer to message boards related to the brand. In either case, the user/advertiser is provided with various capabilities to place advertisements and tie them specifically to a brand and brand parts within a brand site, or the websites from which the content is shared with the brand site. These and other advertising features are enabled by the systems, methods and computer readable media of the advertising modules.

III. Partner Brand Owner-Handler Access and Management

Figure 12:
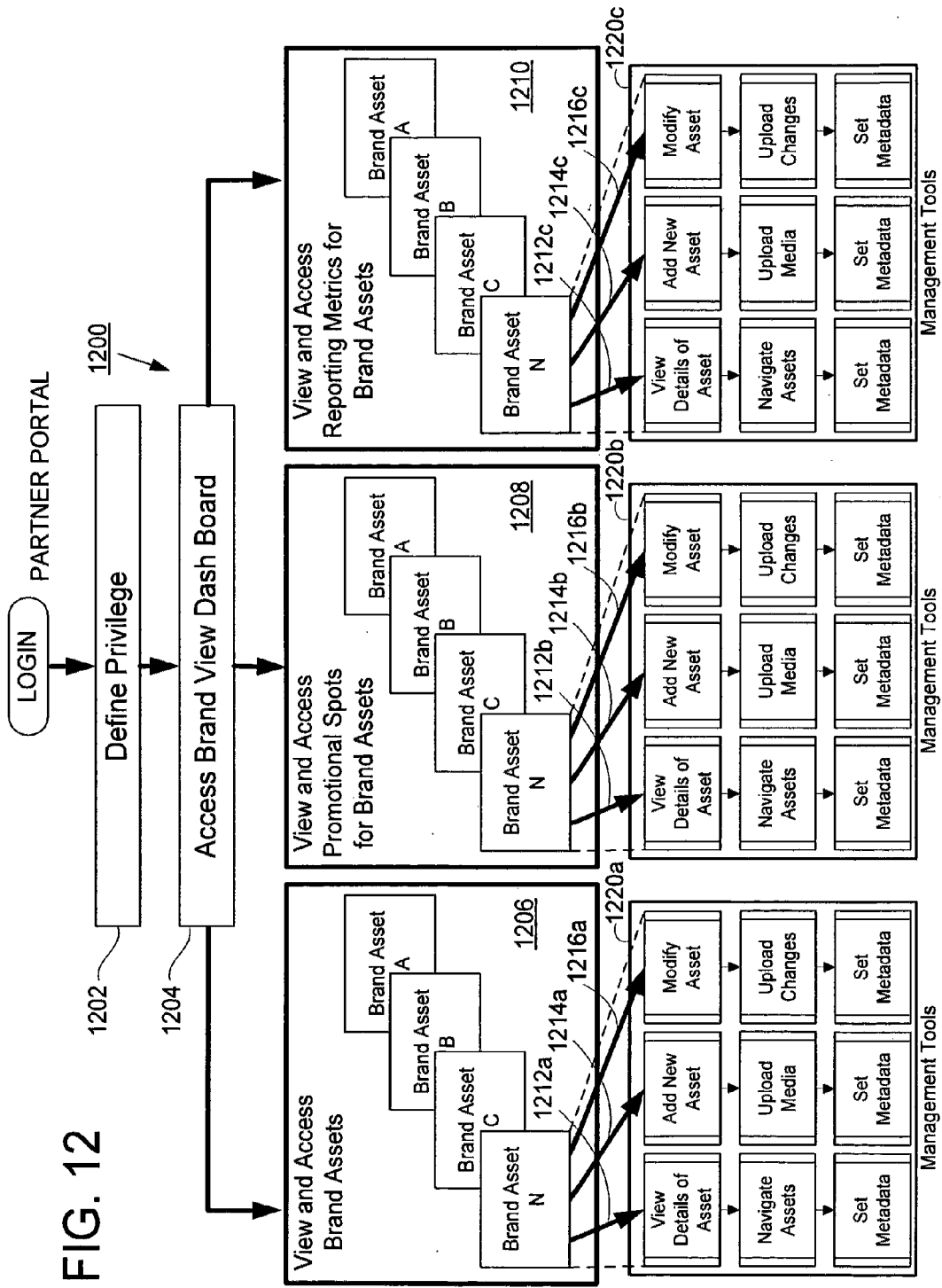
FIG. 12 illustrates a partner portal that defines levels of access for media contributing partners and owners of brand-related media, in accordance with once embodiment of the present invention.

FIG. 12 illustrates a partner portal 1200 that defines levels of access for media contributing partners and owners of brand-related media, in accordance with once embodiment of the present invention. In one example, a partner may enter the partner portal 1200 through a log-on screen (e.g., of a website) over the internet that will define and establish the privilege levels for the particular partner that may be logging in. Specifically, certain partners in organizations will have different levels of privilege that will allow different individuals to make changes to media content related to a brand and perform certain management tasks.

If a particular individual has higher privileges, the individual may be entitled to view more content related to a particular brand, and manage the content with higher freedom. Once the user has logged in and defined the privilege in operation 1202, the process can move to operation 1204 where the user can access a brand view dashboard. The brand view dashboard will enable a particular user to access functional components of one or more brands.

In one embodiment, the user may be accessing a view in access brand assets module 1206 that will enable the user to select a particular asset within a particular category for management. Another module may include a view in access promotional spots for particular brand assets 1208. A user will be allowed to therefore promote specific brand assets with promotional spots in given websites or instances that may be promoted through different media outlets. Another module may include a reporting and metrics view and access module that will allows users to select a particular brand asset and review its performance and associated metrics. The reporting metrics may include, for example, the number of users accessing specific brands, the number of page views, the number of views and durations of specific views, the accessing regions of a specific geographic location, and other information that will allow brand owners to understand if specific brands are experiencing success as anticipated.

From each of the modules 1206, 1208, and 1210, a user is given access to management tools. The management tools 1220a, 1220b, and 1220c will allow specific users to manage specific brand assets. Management of a brand asset can include viewing details of an asset, adding new assets, and modifying an asset. Taking path 1212a, a user may choose to view details of an asset and navigate through specific assets. As the user navigates through the specific assets, as they are placed throughout websites, the user may set or adjust metadata associated with a specific asset or assets.

Through a path 1214a, the user may choose to add a new asset to a specific vertical site, website, or media outlet. When a new asset is added, the user is requested to upload the specific media data files, and once the date files have been updated or in conjunction with the uploading, users may be required to set the metadata. Metadata of specific uploaded media may include the definition of what is being uploaded, and other useful tags that can be used for identification, searching, record keeping, promotional operations, and reporting metrics.

In path 1216a, a user may be allowed to modify an asset that is currently on a specific site or sites. The modification of an asset would require the uploading of changes, and the setting of updated metadata. Each of the management tools 1220a, 1220b, 1220c, would have analogous functionality through its associated paths 1212b, 1212c, 1214b, 1214c, and 1216b, and 1216c.

By providing partners with access to their brands through a defined brand view dashboard, users are able to instantly access, connect with, and make modifications to brand assets that are currently being displayed, promoted, or rendered. In one embodiment, providing the partner portal 1220 to brand owners (users having privileges from a specific brand owner), will allow a faster flow of more current and useful information into the vertical sites that would support specific brands.

Additionally, the partner portal will define a path and medium that would allow partners to have and experience an ownership with their own brands and control over the content, data, placement, and reporting statistics for determining the successful or non-success of specific brand assets. In one embodiment, the media assets of a brand may initially be compiled and promoted by the website owner, and later, the owners can join in an assist in the management of their assets or add more assets. The website owners, can thus manage the asset media and inform the brand owners (though reporting) regarding the progress of specific assets, placements, events, metrics, etc. Thus, the website owners and the brand owners are able to work together to promote and manage the specific media assets of the brand owners.

Figure 13:
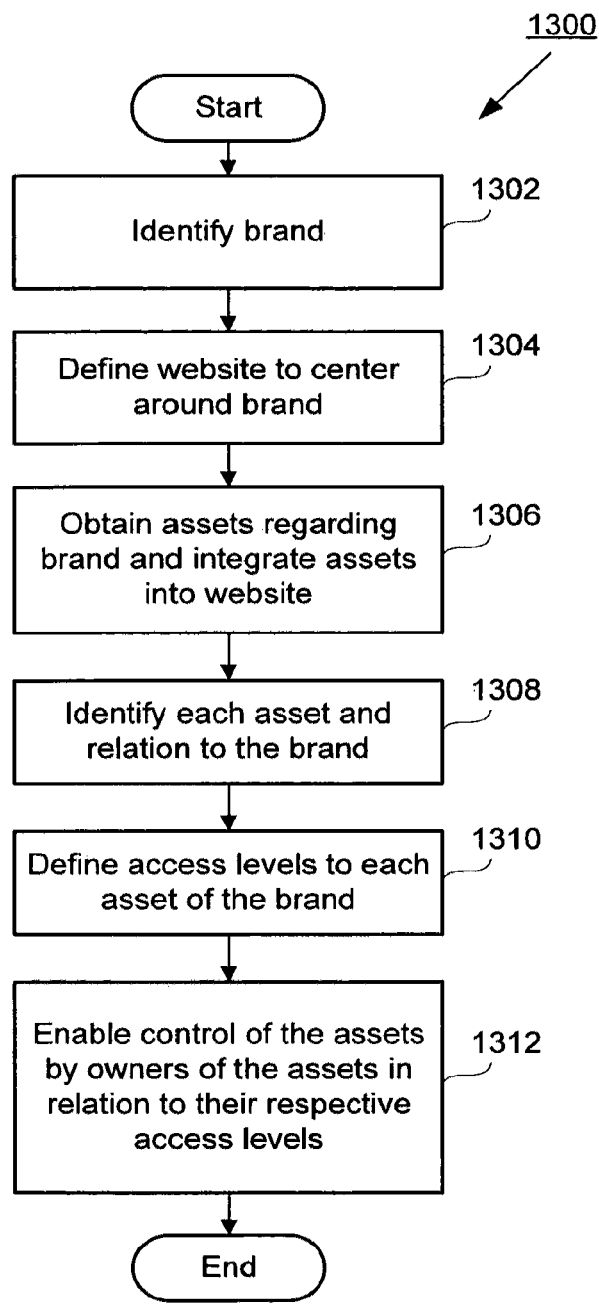
FIG. 13 illustrates a process flowchart that may be used to allow brand owners or brand handlers to manage their brand assets through a partner portal, in accordance with one embodiment of the present invention.

FIG. 13 illustrates a process flowchart 1300 that may be used to allow brand owners or brand handlers to manage their brand assets through a partner portal, in accordance with one embodiment of the present invention. In one example flow, the method begins at operation 1302 where a partner would identify a specific brand. As discussed above, certain brands can have certain sub-brand categories, and it is important for a brand owner to identify which specific brand he or she wishes to manage. Once the brand has been identified in operation 1302, the method moves to operation 1304.

In operation 1304, a website is defined to center around a specific brand. As noted above, the website that is created for a specific brand may not have been prepared or created by the brand owners. That is, the creation of the website could be performed exclusive of any initial activity by a brand owner, but the brand assets can be augmented with additional new/ modified brand assets by a brand owner, once the brand website has been established in operation 1304. In operation 1306, a brand owner may wish to provide additional assets regarding a specific brand and integrate those assets into the brand website.

For instance, FIG. 9 described a brand site for Will Smith, and the brand site for Will Smith may have been formed by a website company to illustrate information, media, and content that centers around the brand defined for Will Smith. In one embodiment, Will Smith or Will Smith's management company could be considered a brand owner of the brand Will Smith. In such a case, the handlers of the brand for Will Smith may be able to access the Will Smith brand site 900 to augment the brand site and add additional media to the brand site.

The handlers of Will Smith may also modify existing assets that are presented in the Will Smith brand site, or delete specific content that may not be suitable or acceptable to the brand owner. Operation 1308 will define each of the assets in relation to the brand by providing specific brand ID markers to each of the assets so that they can be related back to the specific brand or brand family.

In operation 1310, each specific brand asset can be given a specific access level, or certain assets can be grouped into the assets that have the same level to allow different brand owner managers to have different levels of access to the specific assets on a brand site. In operation 1312, the owners of the assets, depending on their privileges, will be enabled with control of those assets in relation to their given access levels. In such an embodiment, the brand owner/handler users, depending on their privilege levels, can access the different management tools 1220, described in FIG. 12.

Figure 14:
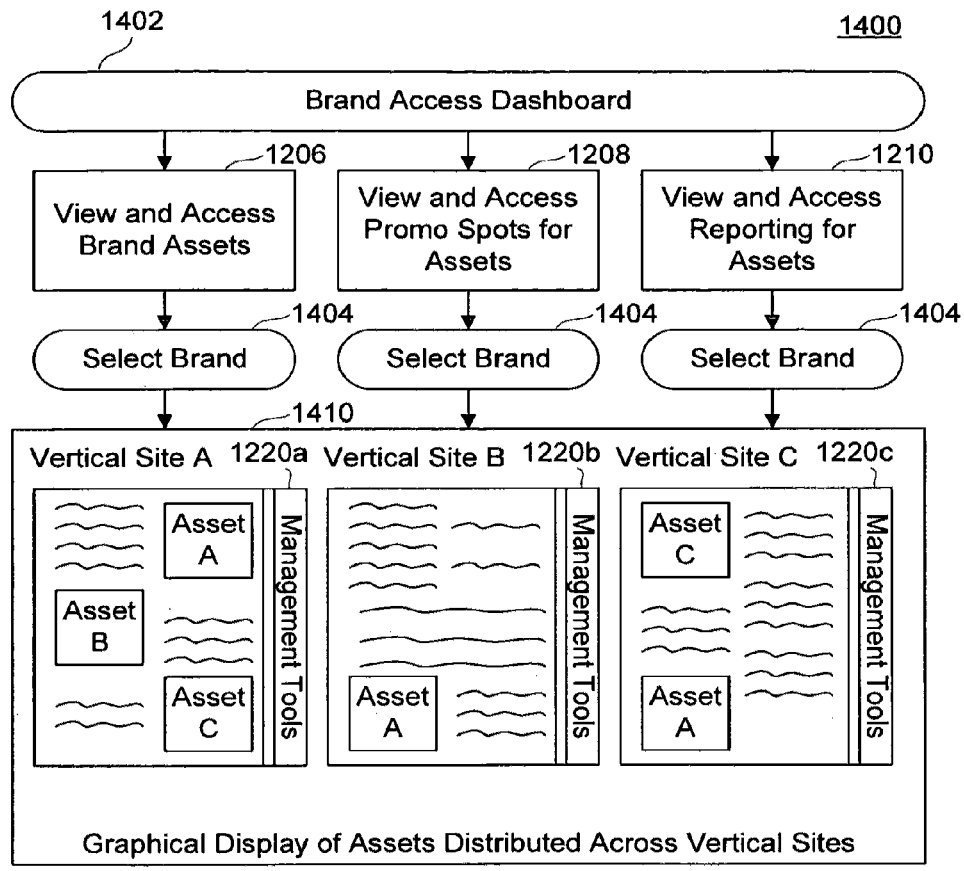
FIG. 14 illustrates a graphical view of an access to a brand access dashboard, in accordance with one embodiment of the present invention.

FIG. 14 illustrates a graphical view of an access to a brand access dashboard 1402, in accordance with one embodiment of the present invention. When a brand access dashboard 1402 is accessed by a specific brand owner, the brand owner is provided with the options to select either view, and access of specific brand assets 1206, view and access promotional spots for specific assets 1208, or view access reporting for specific assets 1210.

Once a particular management task has been selected, the brand owner or accessing owner will be given an option to select a brand 1404. Once the specific brand, which may be among a plurality of brands that a brand owner controls, has been selected, the graphical display 1410 will be provided. The graphical display will illustrate the assets that may be distributed across a plurality of vertical sites. A vertical site may be a website that may have certain types of media, yet the specific assets may be distributed as instances about these various vertical sites. Example instance level 134 vertical sites may include those shown with reference to FIG. 3A above.

In this example, asset A is shown in vertical site A, in vertical site B, and vertical site C. If the user wishes to act upon a specific asset within the vertical sites, the user may access the various management tools 1220*a*, 1220*b*, 1220*c*. By accessing these management tools, the user can then execute the functional operations defined with reference to FIG. 12 in the management tools 1220.

Figure 15:
FIG. 15 illustrates asset definitions for a specific brand, in accordance with one embodiment of the present invention.

FIG. 15 illustrates asset definitions for a specific brand X. 1500 defines levels of identification for the specific brand-related features. A specific brand can have a product or service identifier (ID $x_1$), it can have a media type (ID $x_2$), an asset type (ID $x_3$), and an asset data (ID $x_4$). These asset definitions are used to enable brand owners to drill down into specific assets, asset types, and products to quickly identify the various assets throughout vertical sites, modifies features of specific assets, and track the performance of specific assets as they are distributed through vertical sites as described with reference to FIG. 14. In one embodiment, the relationship of the distributed assets can be managed as shown in FIG. 5C, where each asset is assigned a type of ID.

Figure 16:
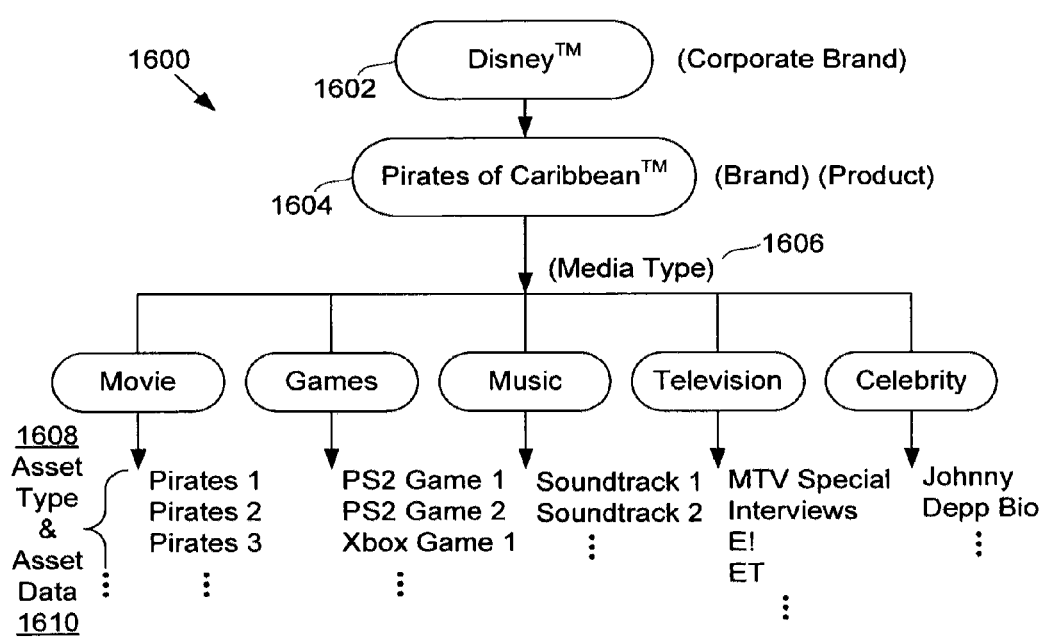
FIG. 16 illustrates a diagram of an example brand hierarchy, in accordance with one embodiment of the present invention.

FIG. 16 illustrates a diagram 1600 of an example brand hierarchy, in accordance with one embodiment of the present invention. The hierarchy may include a corporate brand which may be Disney™ 1602. Disney™ 1602 may have a number of various brands that are part of the corporate brand Disney. One example brand may be the product Pirates of the Carribean™ 1604. Pirates of the Carribean can then have a number of media types 1606. The media types may include movies, games, music, television, celebrity, and others.

Each of those media types 1606 can then in turn have an asset type 1608, as well as asset data 1610. Asset types may include the different types of media. Different types of media may include pictures, movies, images, displays, interactive animations, etc. The asset data may be the actual file or files that encompass the executable content or displayable content for the specific asset types 1608. Each of the category levels defined in 1600 may be associated with a specific ID, and that ID will be categorized and searched, depending on the specific query or identification required by a brand owner, or organizer of a brand site.

IV. Brand Site Product and Computer-Implemented Structure

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A computer-implemented method for defining access to brand related assets, comprising:
   identifying a plurality of separate internet websites having content related to a specific brand;
   selecting a plurality of assets, each asset being a content component related to the specific brand and included in one of the separate internet websites;
   generating a brand website that relates to the specific brand by including in the brand website the plurality of assets that were selected;
   assigning each asset an identifier, the identifier defining a relation of each asset to the specific brand; and
   defining a dashboard access to management tools for the plurality of assets of the specific brand, the dashboard access configured to identify a user privilege for management of specific ones of the plurality of assets, the user privilege enabling one or more of viewing details of an existing asset, adding a new asset to the brand website, and modifying an existing asset in the brand website;
   wherein the user privilege enables management of the plurality of assets including how the assets are integrated with the brand website, the management of the plurality of assets overriding automated control of the plurality of assets.

2. The computer-implemented method for defining access to brand related assets as recited in claim 1, wherein management of the plurality of assets includes,
   generating brand selection view to enable identification of specific brands that relate to the user privilege; and
   granting access to enabling one or more of viewing details of the existing asset, adding the new asset, and modifying the existing asset.

3. The computer-implemented method for defining access to brand related assets as recited in claim 1, wherein management of the plurality of assets includes,
   generating brand promotional spots for specific brands that relate to the user privilege; and
   granting access to enable promoting an existing asset or adding a new asset for promotion.

4. The computer-implemented method for defining access to brand related assets as recited in claim 1, wherein management of the plurality of assets includes,
   accessing reporting metrics for one or more assets that relate to the user privilege.

5. The computer-implemented method for defining access to brand related assets as recited in claim 1, wherein the identifier provides tracking information for compiling use metrics.

6. The computer-implemented method for defining access to brand related assets as recited in claim 5, wherein use metrics define performance of specific assets within the brand website and other websites on which the specific assets are integrated as instances.

7. The computer-implemented method for defining access to brand related assets as recited in claim 5, wherein each of the plurality of assets is media content capable of being represented, displayed, played, viewed, interacted-with, listed, or otherwise rendered.

8. The computer-implemented method for defining access to brand related assets as recited in claim 5, further comprising:
   indexing each of the plurality of assets; and
   searching for particular types of assets by searching the index of the plurality of assets.

9. The computer-implemented method for defining access to brand related assets as recited in claim 8, further comprising:
   presenting a graphical view of each of the searched assets in relation to position and location on the corresponding separate internet website.

10. The computer-implemented method for defining access to brand related assets as recited in claim 9, wherein the separate internet websites are vertical websites having emphasis on a type of media.

11. A computer implemented method for generating a brand website and managing content of the brand website, comprising:
    identifying a plurality of separate internet websites having content related to a brand;
    selecting content components from the separate internet websites for inclusion in the brand website;
    defining the brand website to include the selected content components,
    wherein the selected content components are presented in the brand website, where some of the selected content components are generated by third-party content producers that are not authorized handlers of the brand;
    assigning each of the content components an identifier, the identifier defining a relation of each the content components to the brand or other brands; and
    defining a dashboard access to management tools for the content components of the brand, the dashboard access configured to identify a user privilege for management of specific ones of the content components of the brand, the user privilege enabling one or more of viewing details of an existing content component, adding a new content component, or modifying an existing content component in the brand website;
    wherein the user privilege enables management of the content components, the management including integrating the content components with the brand website and overriding automated control of the content component provided by the third-party content producers.

12. A computer implemented method for generating a brand website and managing content of the brand website as recited in claim 11, further comprising,
    enabling user interactivity with the content components in the brand website, wherein the user interactivity feeds data regarding one or more of content component popularity, usage or revenue generating potential.

13. A computer implemented method for generating a brand website and managing content of the brand website as recited in claim 11, wherein the brand is for a product, service, personality, or a combination thereof, and the brand website is capable of being presented for display on a display of a device capable of having access to an internet connection.

14. A computer implemented method for generating a brand website and managing content of the brand website as recited in claim 11, wherein each of the content components is capable of receiving user interactivity and communicating interactivity metrics to an analytics module,
    wherein the interactivity metrics define one or more of user activity, user satisfaction, user ratings, user contribution, user preferences, and monitored user behavior.

15. A computer implemented method for generating a brand website and managing content of the brand website as recited in claim 11, wherein content components related to the brand are assets that include one or more of game content, movie content, television content, kid content, celebrity content, metadata content, news content, user generated content, brand owner content, advertising content, formatting content, integration content, or navigation and presentation content.

16. A computer implemented method for generating a brand website and managing content of the brand website as recited in claim 15 wherein the content components are configured to be interfaced with a services module that identifies content from the internet websites as related to the brand and defines the link between the content components and the brand website, the link being defined by a bi-directional relationship that establishes a degree of separation between the content components and the brand website, the bi-directional relationship is facilitated by a user identifier that is assigned to each content component.

17. A computer implemented method for generating a brand website and managing content of the brand website as recited in claim 16, wherein the bi-directional relationship is defined between the brand website and the content components in terms of web links, the web links establishing one or more of a brand-entity relation, an entity-entity relation, an entity-asset relation, and nested non-hierarchical relations between the content components and particular ones of the plurality of modules of the brand website.

18. A computer implemented method for generating a brand website and managing content of the brand website as recited in claim 11, wherein the internet websites each target a homogeneous type of media that is consumable by visiting the internet websites, and the internet websites also include content components that are not related to the brand.

19. Computer readable media containing program instructions for executing a brand website and enabling management of content of the brand website, the computer readable media comprising:

program instructions for identifying a plurality of separate internet websites having content related to a brand;

program instructions for selecting content components from the separate internet websites for inclusion in the brand website;

program instructions for defining the brand website to include the selected content components, wherein the selected content components are presented in the brand website, where some of the selected content components are generated by third-party content producers that are not authorized handlers of the brand;

program instructions for assigning each of the content components an identifier, the identifier defining a relation of each the content components to the brand or other brands; and program instructions for defining a dashboard access to management tools for the content components of the brand, the dashboard access configured to identify a user privilege for management of specific ones of the content components of the brand, the user privilege enabling one or more of viewing details of an existing content component, adding a new content component, or modifying an existing content component in the brand website, and the user privilege enables management of the content components including how the assets are integrated with the internet website and overriding automated control of the content component provided by the third-party content producers.

20. The computer readable media as recited in claim 19, wherein the brand is for a product, service, personality, or a combination thereof, and the brand website is capable of being presented for display on a display of a device capable of having access to an internet connection.

21. The computer readable media as recited in claim 19, wherein each of the content components is capable of receiving user interactivity and communicating interactivity metrics to an analytics module,
wherein the interactivity metrics define one or more of user activity, user satisfaction, user ratings, user contribution, and user preferences, and monitored user behavior.

22. The computer readable media as recited in claim 19, wherein content components related to the brand are assets that include one or more of game content, movie content, television content, kid content, celebrity content, metadata content, news content, user generated content, brand owner content, advertising content, formatting content, integration content, or navigation and presentation content.

23. The computer readable media as recited in claim 22 wherein the content components are configured to be interfaced with a services module that identifies content from the internet websites as related to the brand and defines the link between the content components and the brand website, the link being defined by a bi-directional relationship that establishes a degree of separation between the content components and the brand website, the bi-directional relationship is facilitated by a user identifier that is assigned to each content component.

* * * * *